United States Patent
Kwon

(10) Patent No.: US 11,984,583 B2
(45) Date of Patent: May 14, 2024

(54) POSITIVE ELECTRODE FOR ALL-SOLID SECONDARY BATTERY AND ALL-SOLID SECONDARY BATTERY INCLUDING THE SAME

(71) Applicant: Samsung SDI Co., Ltd., Yongin-si (KR)

(72) Inventor: Taeri Kwon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 132 days.

(21) Appl. No.: 17/190,770

(22) Filed: Mar. 3, 2021

(65) Prior Publication Data

US 2021/0280854 A1 Sep. 9, 2021

(30) Foreign Application Priority Data

Mar. 3, 2020 (KR) .......................... 10-2020-0026799

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/42* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS 9,564,628 B2   2/2017  Kim et al.
9,843,038 B2  12/2017  Yamada et al.
(Continued)

FOREIGN PATENT DOCUMENTS

CN       107732193 A    2/2018
JP    2008-234872 A   10/2008
(Continued)

OTHER PUBLICATIONS

Shin, Ji-Woong, et al., "Core-Shell-Structured Li[Ni0.87Co0.08Al0.05]O2 Cathode Material for Enhanced Electrochemical Performance and Thermal Stability of Lithium-Ion Batteries," Journal of the Korean Physical Society, vol. 74, No. 1, Jan. 2019, pp. 53-56. (Year: 2019).*

(Continued)

*Primary Examiner* — Daniel S Gatewood
(74) *Attorney, Agent, or Firm* — Lewis Roca Rothgerber Christie LLP

(57) ABSTRACT

A positive electrode for an all-solid secondary battery includes a positive active material and a sulfide-based solid electrolyte, wherein the positive active material has a structure containing a core and a shell, the shell includes a nickel-based active material containing cobalt at an amount of about 30 mol % or higher, a surface of the positive active material includes a coating layer including at least one lithium ion conductor selected from a lanthanum oxide and a lithium lanthanum oxide, and an amount of the lithium ion conductor is in a range of about 0.1 parts to about 10 parts by weight based on 100 parts by weight of the total weight of the positive active material and the lithium ion conductor.

13 Claims, 8 Drawing Sheets

(51) Int. Cl.
*H01M 4/02* (2006.01)
*H01M 4/485* (2010.01)
*H01M 4/505* (2010.01)
*H01M 4/525* (2010.01)
*H01M 4/62* (2006.01)
*H01M 10/0525* (2010.01)
*H01M 10/0562* (2010.01)

(52) U.S. Cl.
CPC ............ *H01M 4/525* (2013.01); *H01M 4/62* (2013.01); *H01M 10/0525* (2013.01); *H01M 10/0562* (2013.01); *C01P 2002/52* (2013.01); *C01P 2002/85* (2013.01); *C01P 2004/84* (2013.01); *C01P 2006/40* (2013.01); *H01M 2004/021* (2013.01); *H01M 2004/028* (2013.01); *H01M 2300/0068* (2013.01)

(56) References Cited

U.S. PATENT DOCUMENTS

| | | |
|---|---|---|
| 10,128,507 B2 | 11/2018 | Ito et al. |
| 10,276,862 B2 | 4/2019 | Mun et al. |
| 10,826,057 B2 | 11/2020 | Hong |
| 10,873,084 B2 | 12/2020 | Ito et al. |
| 2010/0099027 A1 | 4/2010 | Kikuya et al. |
| 2012/0009474 A1 | 1/2012 | Yanagihara et al. |
| 2013/0302685 A1* | 11/2013 | Kim ................ H01M 4/505 429/231.95 |
| 2014/0272565 A1* | 9/2014 | Gronwald ........... H01M 4/48 429/231.95 |
| 2016/0006032 A1 | 1/2016 | Paulsen et al. |
| 2016/0049646 A1* | 2/2016 | Fujiki ................ H01M 4/38 429/231.95 |
| 2016/0079597 A1 | 3/2016 | Fujiki et al. |
| 2016/0181597 A1* | 6/2016 | Kim ................ H01M 4/525 429/223 |
| 2018/0212233 A1 | 7/2018 | Ito et al. |
| 2019/0044146 A1 | 2/2019 | Ito et al. |
| 2019/0081321 A1 | 3/2019 | Oh et al. |
| 2019/0157660 A1 | 5/2019 | Jang et al. |
| 2019/0181432 A1* | 6/2019 | Yui ................ H01M 10/0585 |
| 2019/0207254 A1 | 7/2019 | Sato et al. |
| 2021/0296691 A1 | 9/2021 | Kwon |
| 2021/0363027 A1* | 11/2021 | Toma ................ H01M 4/366 |

FOREIGN PATENT DOCUMENTS

| | | | |
|---|---|---|---|
| JP | 2008-251532 A | 10/2008 | |
| JP | 2012-018827 A | 1/2012 | |
| JP | 2012-248468 A | 12/2012 | |
| JP | 2014-116149 A | 6/2014 | |
| JP | 2016-042417 A | 3/2016 | |
| JP | 2016-062683 A | 4/2016 | |
| JP | 2016-103411 A | 6/2016 | |
| JP | 2019-096612 A | 6/2019 | |
| JP | 2019-106286 A | 6/2019 | |
| JP | 2019-175830 A | 10/2019 | |
| KR | 10-2013-0125236 A | 11/2013 | |
| KR | 10-2014-0053451 A | 5/2014 | |
| KR | 10-2014-0074174 A | 6/2014 | |
| KR | 10-2016-0010296 A | 1/2016 | |
| KR | 10-2016-0075196 A | 6/2016 | |
| KR | 10-1897365 B1 | 9/2018 | |
| KR | 10-2019-0029187 A | 3/2019 | |
| WO | WO 2017-057078 A | 4/2017 | |
| WO | WO 2018-062079 A | 4/2018 | |
| WO | WO 2019-163846 A | 8/2019 | |
| WO | WO-2019163846 A1 * | 8/2019 | ........... C01G 53/006 |

OTHER PUBLICATIONS

Qian, Danna, et al., "Lithium Lanthanum Titanium Oxides: A Fast Ionic Conductive Coating for Lithium-Ion Battery Cathodes," Chemistry of Materials, 2012, 8 pages.

Shin, Ji-Woong, et al., "Core-Shell-Structured Li[Ni0.87Co0.08Al0.05]O2 Cathode Material for Enhanced Electrochemical Performance and Thermal Stability of Lithium-Ion Batteries," Journal of the Korean Physical Society, vol. 74, No. 1, Jan. 2019, pp. 53-56.

Yoo, Gi-Won, et al., "Novel design of core shell structure by NCA modification on NCM cathode material to enhance capacity and cycle life for lithium secondary battery," Ceramics International, vol. 41, 2015, pp. 1913-1916.

Yoon, Sung-Jun, et al., "Improved Performances of Li[Ni0.65Co0.08Mn0.27]O2 Cathode Material with Full Concentration Gradient for Li-Ion Batteries," Journal of The Electrochemical Society, vol. 162, 2015, pp. A3059-A3063.

EPO Extended European Search Report dated Jul. 22, 2021, issued in corresponding European Patent Application No. 21160577.9 (8 pages).

Japanese Office Action, for Patent Application No. 2021-033301, dated Jan. 18, 2022, 4 pages.

Japanese Office Action, for Patent Application No. 2021-033438, dated Jan. 18, 2022, 3 pages.

U.S. Office Action dated Feb. 17, 2023, issued in U.S. Appl. No. 17/190,733 (9 pages).

EP Office action dated May 30, 2023 issued in corresponding Application No. 21 160 577.9-1108, 5 pages.

Ito, Seitaro, et al., "A rocking chair type all-solid-state lithium ion battery adopting $Li_2O-ZrO_2$ coated $LiNi_{0.8}Co_{0.15}Al_{0.05}O_2$ and a sulfide based electrolyte," Journal of Power Sources, Elsevier, vol. 248, 2014, pp. 943-950.

* cited by examiner

POSITIVE ELECTRODE FOR ALL-SOLID SECONDARY BATTERY AND ALL-SOLID SECONDARY BATTERY INCLUDING THE SAME

CROSS-REFERENCE TO RELATED APPLICATION

This application claims priority to and the benefit of Korean Patent Application No. 10-2020-0026799, filed on Mar. 3, 2020 in the Korean Intellectual Property Office, the entire content of which is incorporated herein by reference. This application includes subject matter related to co-pending and commonly owned U.S. patent application Ser. No. 17/190,733, filed Mar. 3, 2021, the same date as this application, the entire content of which is incorporated herein by reference.

BACKGROUND

1. Field

One or more aspects of embodiments of the present disclosure relate to a positive electrode for an all-solid secondary battery and an all-solid secondary battery including the positive electrode.

2. Description of Related Art

Related art lithium secondary batteries utilize a liquid electrolyte and may be readily ignited when exposed to water in the air, thus posing a stability problem. This stability issue is becoming more important as electric vehicles become more commercially viable. Accordingly, recently there has been active research on all-solid-state secondary batteries utilizing a solid electrolyte formed of an inorganic material, for the purpose of improving safety. All-solid-state secondary batteries are receiving attention as next-generation secondary batteries with the goals of improved stability, high energy density, high power output, long life, simplification of manufacturing processes, formation of large/compact batteries, and/or reduced costs.

An example all-solid-state secondary battery includes a positive electrode, a solid electrolyte layer, and a negative electrode, and the all-solid secondary battery has high internal resistance in a battery electrode and thus generally uses a small-particle positive active material having small-size particles to facilitate ionic conductivity.

However, when such a positive active material is utilized, resistance in the positive electrode may be high because the positive electrode has a low mixture density, which may decrease high-rate characteristics and/or lifetime characteristics of the battery, and thus improvements in this regard are desired.

SUMMARY

One or more aspects of embodiments of the present disclosure are directed toward a novel positive electrode for an all-solid secondary battery and an all-solid secondary battery including the positive electrode.

Additional aspects will be set forth in part in the description which follows and, in part, will be apparent from the description, or may be learned by practice of the presented embodiments of the disclosure.

One or more embodiments of the present disclosure provide a positive electrode for an all-solid secondary battery including a positive active material and a sulfide-based solid electrolyte, the positive active material being a nickel-based active material having a structure including a core and a shell, wherein the shell includes a nickel-based active material containing cobalt (e.g., a first nickel-based active material), a surface of the positive active material includes a coating layer including at least one lithium ion conductor selected from a lanthanum oxide and a lithium lanthanum oxide, and an amount of the lithium ion conductor is in a range of about 0.1 parts to about 10 parts by weight based on 100 parts by weight of the total weight of the positive active material and the lithium ion conductor.

One or more embodiments of the present disclosure provide an all-solid secondary battery including a positive electrode; a negative electrode; and a sulfide-based solid electrolyte layer disposed between the positive electrode and the negative electrode, wherein the positive electrode includes the positive active material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
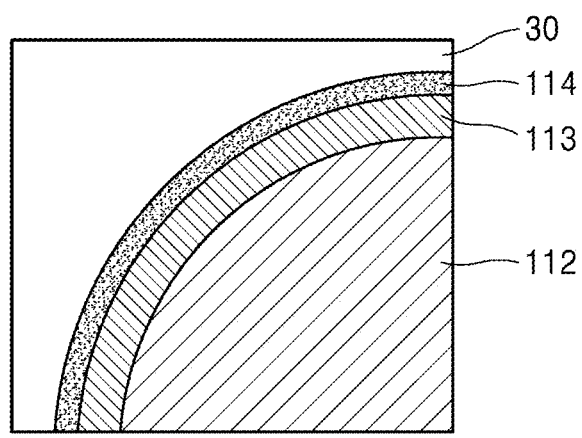
FIG. 1 shows a schematic partial structure of a sulfide-based solid electrolyte disposed on a positive active material, according to an embodiment.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are described by referring to the drawings, merely in order to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list.

As used herein, the singular forms "a," "an," and "the" are intended to include the plural forms as well, unless the context clearly indicates otherwise. Further, the use of "may" when describing embodiments of the present disclosure refers to "one or more embodiments of the present disclosure".

Hereinafter, according to one or more embodiments, a positive electrode for an all-solid secondary battery, an all-solid secondary battery including the positive electrode, and a method of preparing the all-solid secondary battery will be described in more detail with reference to the attached drawings.

According to an embodiment, a positive electrode for an all-solid secondary battery includes a positive active material and a sulfide-based solid electrolyte, the positive active material is (e.g., a nickel-based active material) having a structure containing a core and a shell, the shell includes a (e.g., first) nickel-based active material containing cobalt, a surface of the positive active material includes a coating layer including at least one lithium ion conductor selected from a lanthanum oxide and a lithium lanthanum oxide, and an amount of the lithium ion conductor is in a range of about 0.1 parts to about 10 parts by weight based on 100 parts by weight of the total weight of the positive active material (e.g., nickel-based active material) and the lithium ion conductor.

In some embodiments, an amount of cobalt in the nickel-based active material containing cobalt in the shell may be about 30 mol % or higher.

As used herein, the term "100 parts by weight of the total weight of the positive active material and the lithium ion conductor" refers to 100 parts by weight of the total amount of the nickel-based active material containing a core and a shell and the lithium ion conductor.

An amount of the lithium ion conductor in the coating layer may be in a range of about 0.1 parts to about 10 parts by weight. When the amount of the lithium ion conductor is less than about 0.1 parts by weight, the effect of suppressing diffusion of cobalt (Co), sulfur (S), and/or phosphorus (P) between the positive electrode and the sulfide-based solid electrolyte may be insignificant, and thus the effect of decreasing interfacial resistance may not be satisfactory. When the amount of the lithium ion conductor is higher than about 10 parts by weight, the capacity characteristics of the battery may be degraded.

As referred to herein, a lanthanum oxide may be represented by the formula, $LaO_2$, and a lithium lanthanum oxide may be represented by Formula 1:

$$aLi_2O\text{—}LaO_2 \qquad \text{Formula 1}$$

In Formula 1, $0.1 \leq a \leq 2.0$.

The compound of Formula 1 may be, for example, $Li_2O\text{—}LaO_2$ (e.g., a=1).

When the positive active material is coated with at least one lithium ion conductor selected from a lanthanum oxide and a lithium lanthanum oxide, diffusion of Co, P, and/or S between the positive electrode and the sulfide-based solid electrolyte may be suppressed or reduced, thereby preventing or reducing generation of a lithium depletion layer, which thus may decrease interfacial resistance in the lithium battery.

FIG. 1 shows a partial structure of a sulfide-based solid electrolyte disposed on a positive active material, according to an embodiment.

Referring to FIG. 1, a shell 113 containing a (first) nickel-based active material containing cobalt may be disposed on a core 112 including at least one selected from a first positive active material and a second positive active material (e.g., a second nickel-based active material), and a coating layer 114 including at least one lithium ion conductor selected from a lanthanum oxide and a lithium lanthanum oxide may exist on the shell 113. The coating layer 114 may be in contact (e.g., direct contact) with the sulfide-based solid electrolyte 30. When the coating layer 114 containing a lithium ion conductor is formed on the shell 113, the positive active material may have improved capacity and/or high-rate characteristics.

Here, "a first positive active material" and "a second positive active material" may be selected identically or differently from each other, and may each independently be selected from general positive electrode active materials. The general positive active material will be described later.

An amount of cobalt in the nickel-based active material containing cobalt of the shell may be about 30 mol % or higher.

The presence of lanthanum in the coating layer 114 and the presence of cobalt in the shell 113 of the positive active material according to an embodiment may be confirmed by energy-dispersive X-ray (EDAX) analysis.

When the shell 113 including a nickel-based active material containing cobalt is disposed as shown in FIG. 1, interfacial resistance may decrease, and capacity and/or high-rate characteristics of the lithium battery may further be improved. An amount of cobalt in the nickel-based active material containing cobalt may be about 30 mol % or higher. A thickness of the shell 113 including a nickel-based active material containing cobalt may be in a range of about 5 nm to about 100 nm, and a thickness of the coating layer 114 including the lithium ion conductor may be in a range of about 1 nm to about 50 nm.

In one embodiment, an amount of cobalt in the nickel-based active material containing cobalt may be, for example, in a range of about 30 mol % to about 60 mol %, or, for example, about 35 mol % to about 55 mol %. An amount of the nickel-based active material containing cobalt may be in a range of about 0.3 parts to about 10 parts by weight based on 100 parts by weight of the total weight of the nickel-based active material having a structure containing a core and a shell.

The nickel-based active material containing cobalt may be, for example, a compound represented by Formula 2:

$$Li_aNi_{1-x-y-z}Co_xM1_yM2_zO_2. \qquad \text{Formula 2}$$

In Formula 2, $0.9 \leq a \leq 1.3$, M1 may be Mn or Al, M2 may be boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof, $0.3 \leq x \leq 0.6$, $0.002 \leq y \leq 0.05$, $0 \leq z < 1$, and $x+y+z=1$.

In Formula 2, an amount of nickel may be in a range of about 40 mol % to about 70 mol %, an amount of cobalt may be in a range of about 30 mol % to about 60 mol %, and an amount of M1 may be in a range of about 0.2 mol % to about 5 mol %.

The compound represented by Formula 2 may be, for example, $LiNi_{0.47}Co_{0.5}Al_{0.03}O_2$, $LiNi_{0.88}Co_{0.105}Al_{0.015}O_2$, $LiNi_{0.915}Co_{0.07}Al_{0.015}O_2$, $LiNi_{0.917}Co_{0.069}Al_{0.014}O_2$ (NCA), or $LiNi_{0.93}Co_{0.055}Al_{0.015}O_2$.

In the positive electrode, an amount of the solid electrolyte 30 may be in a range of about 5 parts to about 15 parts by weight, the total amount of the positive active material may be in a range of about 80 parts to about 93 parts by weight, an amount of a conducting agent may be in a range of about 0.1 parts to about 1 part by weight, and an amount of a binder may be in a range of about 0.1 part to about 2 parts by weight, each based on 100 parts by weight of the total weight of the positive electrode.

The positive active material according to an embodiment and/or the second nickel-based active material of the core may be, for example, a compound represented by Formula 3:

$$Li_a(Ni_{1-x-y-z}Co_xM1_yM2_z)O_2. \quad \text{Formula 3}$$

In Formula 3, M1 may be manganese (Mn), aluminum (Al), or a combination thereof, M2 may be boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof, $0.95 \leq a \leq 1.3$, $x \leq (1-x-y-z)$, $y \leq (1-x-y-z)$, $0 < x < 1$, $0 \leq y < 1$, and $0 \leq z < 1$.

In Formula 3, $0 < x < 0.5$, and x may be in a range of about 0.005 to about 0.3, about 0.01 to about 0.25, or about 0.03 to about 0.20.

In Formula 3, $0 \leq y < 0.5$, and y may be in a range of about 0.002 to about 0.05, about 0.003 to about 0.04, or about 0.004 to about 0.03. In some embodiments, $0 \leq z < 0.5$, and z may be in a range of about 0.002 to about 0.05, about 0.003 to about 0.04, or about 0.005 to about 0.03.

An amount of nickel in Formula 3 may be higher than the amounts of each of cobalt, M1, and M2. For example, in Formula 3, 1-x-y may be in a range of about 0.8 to about 0.98 or about 0.8 to about 0.95.

In Formula 3, an amount of nickel may be in a range of about 80 mol % to about 98 mol %, for example, about 80 mol % to about 95 mol %. When the amount of nickel is this high, a positive electrode having good capacity characteristics may be obtained. In some embodiments, an amount of cobalt may be in a range of about 0.5 mol % to about 30 mol %, for example, about 1 mol % to about 25 mol % or about 3 mol % to about 20 mol %.

In Formula 3, when M1 is manganese, an amount of manganese may be in a range of about 0.2 mol % to about 5 mol %, for example, about 0.3 mol % to about 4 mol % or about 0.4 mol % to about 3 mol %. In Formula 3, when M1 is aluminum, an amount of aluminum may be in a range of about 0.2 mol % to about 5 mol %, for example, about 0.3 mol % to about 4 mol %, or about 0.5 mol % to about 3 mol %.

The compound represented by Formula 3 may be, for example, a compound represented by Formula 4 or a compound represented by Formula 5:

$$LiNi_{1-x-y}Co_xAl_yO_2. \quad \text{Formula 4}$$

In Formula 4, $0.005 \leq x \leq 0.6$ and $0.002 \leq y \leq 0.05$.

$$LiNi_{1-x-y}Co_xMn_yO_2. \quad \text{Formula 5}$$

In Formula 5, $0.005 \leq x \leq 0.6$ and $0.002 \leq y \leq 0.05$.

When the compound represented by Formula 4 is a cobalt-rich compound, $0.3 \leq x \leq 0.6$ and $0.002 \leq y \leq 0.05$. in some embodiments, in Formula 4, $0.005 \leq x \leq 0.3$ and $0.002 \leq y \leq 0.05$.

In one embodiment, the compound represented by Formula 4 may include an amount of nickel in a range of about 40 mol % to about 80 mol %, an amount of cobalt in a range of about 30 mol % to about 60 mol %, and an amount of aluminum in a range of about 0.2 mol % to about 5 mol %. In some embodiments, the compound represented by Formula 4 may include an amount of nickel in a range of about 80 mol % to about 98 mol %, an amount of cobalt in a range of about 30 mol % to about 60 mol %, and an amount of aluminum in a range of about 0.2 mol % to about 5 mol %.

In one embodiment, the compound represented by Formula 5 may include an amount of nickel in a range of about 40 mol % to about 80 mol %, an amount of cobalt in a range of about 30 mol % to about 60 mol %, and an amount of manganese in a range of about 0.2 mol % to about 5 mol %. In some embodiments, the compound represented by Formula 5 may include an amount of nickel in a range of about 80 mol % to about 98 mol %, an amount of cobalt in a range of about 30 mol % to about 60 mol %, and an amount of manganese in a range of about 0.2 mol % to about 5 mol %.

In one embodiment, the compound represented by Formula 3 may be, for example, $LiNi_{0.896}Co_{0.072}Mn_{0.032}O_2$, $LiNi_{0.917}Co_{0.069}Al_{0.014}O_2$, $LiNi_{0.88}Co_{0.105}Al_{0.015}O_2$, $LiNi_{0.88}Co_{0.105}Mn_{0.015}O_2$, or $LiNi_{0.845}Co_{0.105}Mn_{0.05}O_2$.

Hereinafter, a method of preparing a positive active material according to an embodiment will be described.

The method may include adding and mixing a cobalt precursor to a nickel-based active material to obtain a mixture, and heat-treating the mixture at a temperature in a range of about 600° C. to about 800° C., or, for example, about 650° C. to about 750° C. to obtain a positive active material including a core including a nickel-based active material (e.g., a second nickel-based active material) and a shell including a nickel-based active material containing cobalt (e.g., a first nickel-based active material). The heat-treating may be performed under an oxygen atmosphere or air.

Sodium hydroxide may be added to the precursor mixture to control the pH of the mixture.

The cobalt precursor may be cobalt sulfate, cobalt acetate, cobalt nitrate, or cobalt oxide.

An average particle diameter of the positive active material is not particularly limited, but may be in a range of about 5 μm to about 50 μm or about 10 μm to about 100 μm.

A coating layer containing at least one lithium ion conductor selected from a lanthanum oxide and a lithium lanthanum oxide may be formed on the positive active material. When the lithium ion conductor is the compound represented by Formula 1, the coating layer containing a lithium ion conductor may be formed on the nickel-based active material containing cobalt, for example according to the preparation method disclosed in the Korean Patent No. 10-2014-0074174 A and U.S. Pat. No. 10,128,507, the entire content of each of which is incorporated herein by reference.

A lanthanum alkoxide may be dissolved and dispersed in an organic solvent to obtain a composition (e.g., coating composition), the composition may be coated on a surface of the positive active material, and the resultant may be heat-treated according to an organic liquid-phase method to form the coating layer in the form of a substantially continuous film that is substantially evenly formed on a surface of the positive active material.

A temperature of the heat-treatment may be, for example, in a range of about 300° C. to about 450° C., or, for example, about 300° C. to about 400° C. The heat-treatment may be performed under an oxygen atmosphere or air, and a time of the heat-treatment may be selected depending on the heat-treatment temperature and may be, for example, in a range of about 0.5 hours to about 20 hours.

Non-limiting examples of the lanthanum alkoxide include lanthanum methoxide, lanthanum ethoxide, lanthanum propoxide, lanthanum butoxide, or a combination thereof, and non-limiting examples of the organic solvent include ethanol, isopropanol, and/or methanol. Unlike when a coating layer is formed utilizing a solid-phase method, the coating layer may be prepared in the form of a substantially even and continuous film utilizing the organic liquid-phase method as described.

A thickness of the coating layer may be, for example, in a range of about 0.1 nm to about 100 nm, about 5 nm to about 100 nm, about 5 nm to about 50 nm, about 5 nm to about 30 nm, about 5 nm to about 20 nm, or about 10 nm.

A positive electrode having a mixture density in a range of about 3.4 g/cm$^3$ to about 3.7 g/cm$^3$ may be prepared utilizing the positive active material.

A nickel-based active material as a starting material subjected to be mixed with the cobalt precursor, may be prepared by following any suitable preparation method. For example, an aluminum precursor and/or a manganese precursor, a nickel cobalt hydroxide, and a lithium precursor may be mixed to obtain a mixture, and the mixture may be heat-treated to prepare the nickel-based active material as the starting material.

A precursor containing a metal to be doped may be added to the mixture. Non-limiting examples of the precursor include barium hydroxide, magnesium hydroxide, and/or titanium oxide.

The heat-treatment conditions may be selected according to a type or kind of the precursor, and a temperature of the heat-treatment may be, for example, in a range of about 600° C. to about 900° C., or, for example, about 650° C. to about 750° C. The oxidizing gas atmosphere may refer to, for example, air or an oxygen atmosphere.

The nickel cobalt hydroxide may be prepared by following any suitable preparation method, for example, a co-precipitation method. The nickel cobalt hydroxide obtained by following this preparation method may be divided into a large-particle nickel cobalt hydroxide and a small-particle nickel cobalt hydroxide.

According to another aspect of an embodiment, an all-solid secondary battery includes the positive electrode, a sulfide-based solid electrolyte, and a negative electrode.

Hereinafter, an all-solid secondary battery according to one or more embodiments will be described in more detail.

According to an embodiment, an all-solid secondary battery includes a positive electrode; a negative electrode; and a solid electrolyte layer disposed between the positive electrode and the negative electrode, wherein the positive electrode includes a positive current collector and a positive active material layer disposed on the positive current collector, wherein the negative electrode includes a negative current collector and a negative active material layer disposed on the negative current collector.

The positive electrode includes a positive electrode active material according to an embodiment.

All-Solid Secondary Battery

Figure 2A:
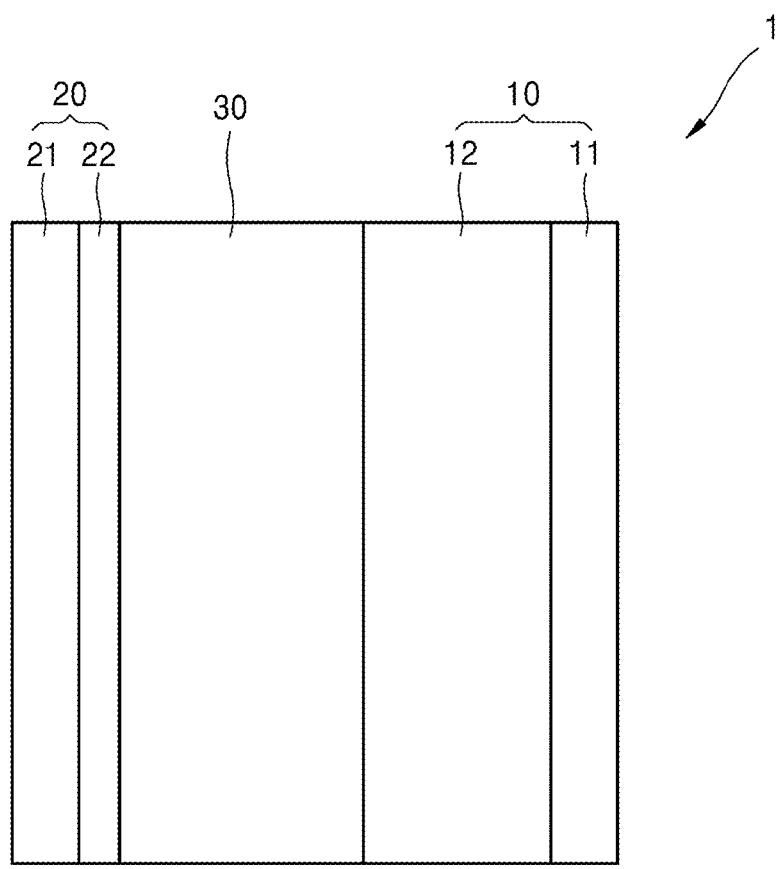
FIG. 2A shows a schematic structure of an all-solid secondary battery, according to an embodiment.

Referring to FIG. 2A, an all-solid secondary battery 1 includes a positive electrode 10; a negative electrode 20; and a solid electrolyte layer 30 disposed between the positive electrode 10 and the negative electrode 20, wherein the positive electrode 10 includes a positive current collector 11 and a positive active material layer 12 disposed on the positive current collector 11, wherein the negative electrode 20 includes a negative current collector 21 and a negative active material layer 22 disposed on the negative current collector 21.

Positive Electrode: Positive Current Collector

The positive current collector 11 may be, for example, a plate or a foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In some embodiments, the positive current collector 11 may be omitted (e.g., may not be included).

Positive Electrode: Positive Active Material

The positive active material layer 12 may include, for example, a positive active material and a solid electrolyte. The solid electrolyte in the positive electrode 10 may be similar to or different from the solid electrolyte in the solid electrolyte layer 30. A detailed description of the solid electrolyte is provided in relation to the solid electrolyte layer 30.

The positive electrode may be a positive electrode according to an embodiment. The positive electrode may further include a positive active material described hereafter.

a first positive active material and a second positive active material

The positive active material may be a positive active material capable of reversibly absorbing and desorbing lithium ions. Non-limiting examples of the positive active material include a lithium transition metal oxide (such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, and/or a lithium iron phosphate; a nickel sulfide; a copper sulfide; a lithium sulfide; an iron oxide; and/or a vanadium oxide), but embodiments are not limited thereto, and any material available as a positive active material in the art may be utilized. The positive active material may be utilized alone or in a mixture of at least two selected from these examples.

The lithium transition metal oxide may be or include, for example, a compound represented by one of the following formulae:

$Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1, 0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1, 0 \leq b \leq 0.5, 0 \leq c \leq 0.05$, and $0 < \alpha \leq 2$); $Li_aNi_{1-b-c}Co_bB'_cO_{2-\alpha}F'_\alpha$ (where $0.90 \leq a \leq 1, 0 \leq b \leq 0.5, 0 \leq c \leq 0.05$, and $0 < \alpha < 2$); $Li_aNi_{1-b-c}Co_bB'_cO_{2-\alpha}F'_2$ (where $0.90 \leq a \leq 1, 0 \leq b \leq 0.5, 0 \leq c \leq 0.05$, and $0 < \alpha < 2$); $Li_aNi_{1-b-c}Mn_bB'_cD_\alpha$ (where $0.90 \leq a \leq 1, 0 \leq b \leq 0.5, 0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1, 0 \leq b \leq 0.5, 0 \leq c \leq 0.05$, and $0 < \alpha < 2$); $Li_aNi_{1-b-c}Mn_bB'_cO_{2-\alpha}F'_2$ (where $0.90 \leq a \leq 1, 0 \leq b \leq 0.5, 0 \leq c \leq 0.05$, and $0 < \alpha < 2$); $Li_aNi_bE_cG'_dO_2$ (where $0.90 \leq a \leq 1, 0 \leq b \leq 0.9, 0 \leq c \leq 0.5$, and $0.001 \leq d \leq 0.1$); $Li_aNi_bCo_cMn_dG'_eO_2$ (where $0.90 \leq a \leq 1, 0 \leq b \leq 0.9, 0 \leq c \leq 0.5, 0 \leq d \leq 0.5$, and $0.001 \leq e \leq 0.1$); $Li_aNiG'_bO_2$ (where $0.90 \leq a \leq 1$ and $0.001 \leq b \leq 0.1$); $Li_aCoG'_bO_2$ (where $0.90 \leq a \leq 1$ and $0.001 \leq b \leq 0.1$); $Li_aMnG'_bO_2$ (where $0.90 \leq a \leq 1$ and $0.001 \leq b \leq 0.1$); $Li_aMn_2G'_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G' may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds may have a surface coating layer (hereinafter, also referred to as "coating layer"). In some embodiments, a mixture of a compound without a coating layer and a compound having a coating layer, the compounds being selected from the compounds listed, may be utilized. In some embodiments, the coating layer may include at least one compound of a coating element selected from the group consisting of an oxide compound, a hydroxide compound, an oxyhydroxide compound, an oxycarbonate compound, and a hydroxycarbonate compound of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), niobium (Nb), or a mixture thereof. In some embodiments, the coating layer may be formed utilizing any method that does not adversely affect the physical properties of the positive active material when a compound of the coating element is utilized. For example, the coating layer may be formed utilizing a spray coating method or a dipping method. The coating methods may be well understood by one of ordinary skill in the art, and thus a detailed description thereof will not be provided.

The positive active material may include, for example, a lithium salt of a transition metal oxide that has a layered rock-salt structure (e.g., crystal lattice or crystal structure), among the examples of the lithium transition metal oxide. The term "layered rock-salt structure" refers to a structure in which an oxygen atom layer and a metal atom layer are alternately and regularly arranged in a <111> direction in a cubic rock-salt structure, where each of the atom layers forms (e.g., is present as) a two-dimensional flat plane. The term "cubic rock-salt structure" refers to a sodium chloride (NaCl) structure, which is a crystalline structure in which face-centered cubic (fcc) lattices respectively formed of anions and cations are shifted by a half unit of each unit lattice. Non-limiting examples of the lithium transition metal oxide having the layered rock-salt structure include a ternary lithium transition metal oxide such as $LiNi_xCo_yAl_zO_2$ (NCA) and/or $LiNi_xCo_yMn_zO_2$ (NCM) (where $0<x<1$, $0<y<1$, $0<z<1$, and $x+y+z=1$). When the positive active material includes a ternary transition metal oxide having the layered rock-salt structure, the energy density and/or thermal stability of the all-solid secondary battery 1 may be improved.

The positive active material may be covered by a coating layer as described above. The coating layer may be any material that can be utilized as a coating layer of a positive active material of an all-solid secondary battery in the art. The coating layer may be, for example, $Li_2O$—$ZrO_2$ (LZO), $Li_2O$—$LaO_2$ (LLaO), or a combination thereof.

When the positive active material includes a ternary lithium transition metal oxide including nickel (Ni) (such as NCA and/or NCM), a capacity density of the all-solid secondary battery 1 may be increased, and metal elution from the positive active material in a charged state may be reduced. As a result, the all-solid secondary battery 1 according to an embodiment may have improved cycle characteristics in a charged state.

A particle shape of the positive active material may be a true spherical shape, an elliptical shape, and/or a spherical shape. A particle diameter of the positive active material is not particularly limited but may be in a range applicable to a positive active material of an all-solid secondary battery in the art. An amount of the positive active material of the positive electrode 10 is not particularly limited and may be in a range applicable to a positive electrode layer of an all-solid secondary battery in the art. An average particle diameter (D50) of the positive active material is not particularly limited, but may be in a range of about 5 μm to about 50 μm, or about 10 μm to about 100 μm. The average particle diameter of the positive active material may be, for example, a median diameter (D50), and may be measured by utilizing a laser diffraction particle diameter distribution meter, scanning electron microscope (SEM), and/or a transmission electron microscope (TEM).

Positive Electrode: Solid Electrolyte

For example, the positive active material layer 12 may include a solid electrolyte. The solid electrolyte in the positive electrode 10 may be identical to or different from a solid electrolyte in the solid electrolyte layer 30. A detailed description of the solid electrolyte is provided in relation to the solid electrolyte layer 30.

An average particle diameter (D50) of the solid electrolyte in the positive active material layer 12 may be smaller than that of the solid electrolyte in the solid electrolyte layer 30. For example, an average particle diameter (D50) of the solid electrolyte in the positive active material layer 12 may be about 90% or less, about 80% or less, about 70% or less, about 60% or less, about 50% or less, about 40% or less, about 30% or less, or about 20% or less of an average particle diameter (D50) of the solid electrolyte in the solid electrolyte layer 30.

Positive Electrode: Binder

The positive active material layer 12 may include a binder. Non-limiting examples of the binder include styrene-butadiene rubber (SBR), polytetrafluoroethylene, polyvinylidene fluoride, and/or polyethylene.

Positive Electrode: Conducting Agent

The positive active material layer 12 may include a conducting agent. Non-limiting examples of the conducting agent include graphite, carbon black, acetylene black, ketjen black, carbon fiber, and/or metal powder.

Positive Electrode: Other Additives

The positive electrode 10 may further include additives such as a filler, a coating agent, a dispersant, and/or an ionic conducting agent in addition to the positive active material, solid electrolyte, binder, and conducting agent described above.

The filler, coating agent, dispersant, and ion conducting agent that may be included in the positive electrode 10 may be the same materials that are generally utilized for similar purposes in an electrode of an all-solid secondary battery in the art.

In the positive electrode 10, an amount of the positive active material may be in a range of about 80 parts to about 93 parts by weight, an amount of the solid electrolyte may be in a range of about 5 parts to about 10 parts by weight, an amount of the conducting agent may be in a range of about 0.5 parts to about 5 parts by weight, for example, about 0.5 parts to about 1 part by weight, and an amount of the binder may be in a range of about 0.1 parts to about 5 parts by weight, for example, about 0.1 parts to about 2 parts by weight. Here, the amounts of the positive active material, solid electrolyte, binder, and conducting agent are each based on 100 parts by weight of the total weight of the positive electrode. The total weight of the positive electrode refers to the total amount of the positive active material, solid electrolyte, binder, and conducting agent.

A thickness of the positive electrode may be, for example, in a range of about 70 µm to about 150 µm.

Solid Electrolyte Layer

Solid Electrolyte Layer: Sulfide-Based Solid Electrolyte

Figure 2B:
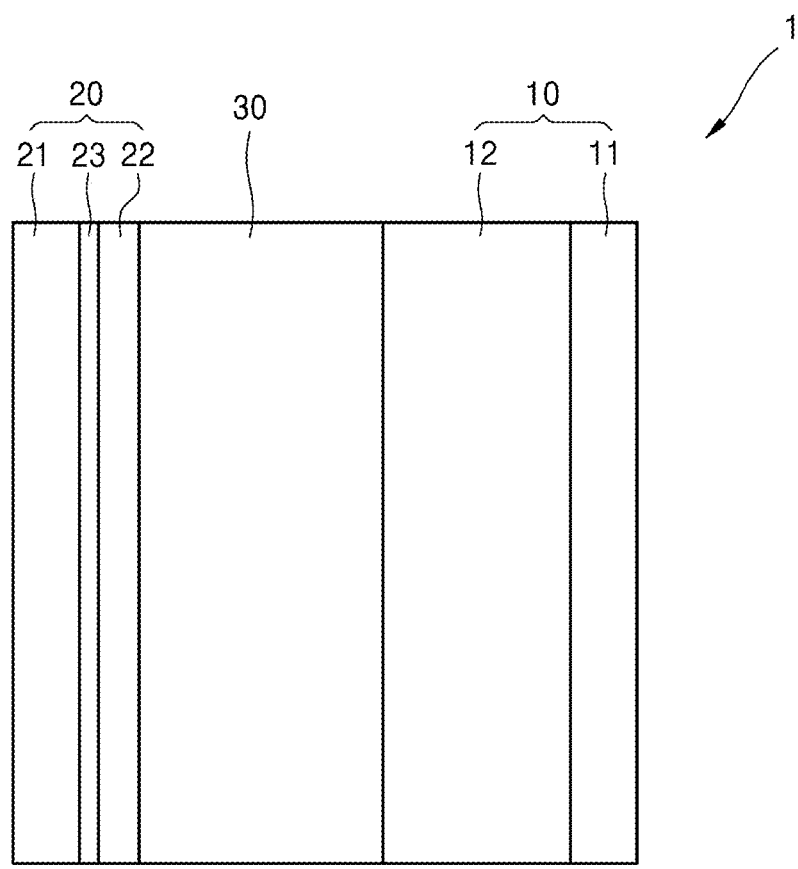
FIG. 2B shows a schematic structure of an all-solid secondary battery, according to another embodiment.
Figure 2C:
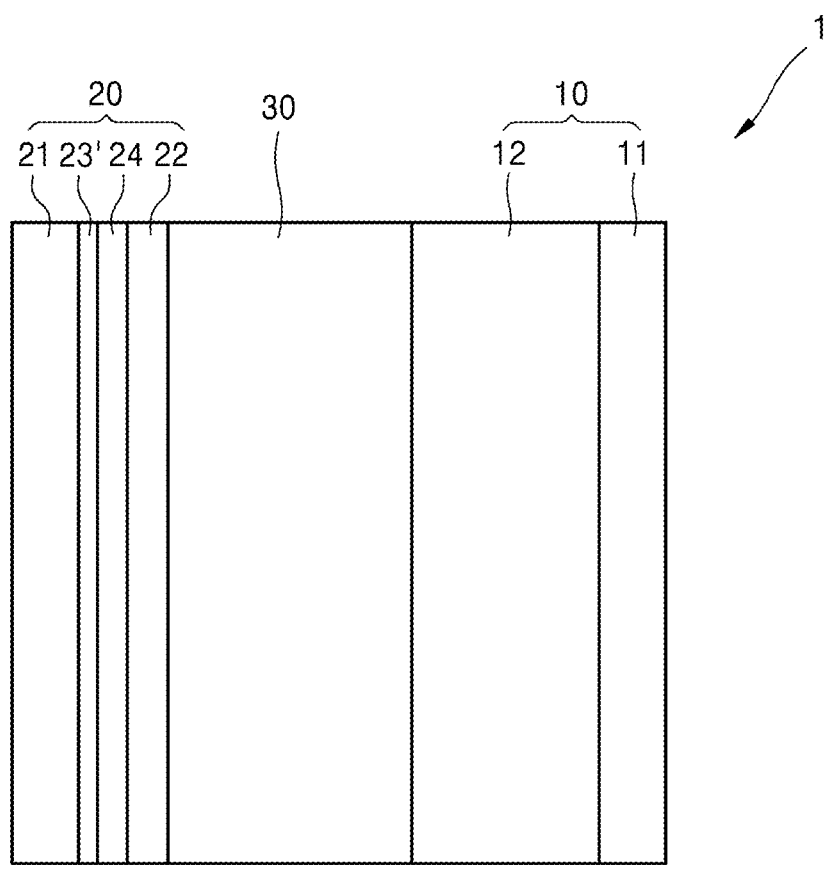
FIG. 2C shows a schematic structure of an all-solid secondary battery, according to another embodiment.

Referring to FIGS. 2A to 2C, the solid electrolyte layer 30 includes a sulfide-based solid electrolyte disposed between the positive electrode 10 and the negative electrode 20.

The sulfide-based solid electrolyte may include, for example, at least one selected from $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n each are a positive number, and Z represents any of Ge, Zn, and Ga), $Li_2S$—$GeS_2$, $Li_2S$—$SiS_2$—$Li_3PO_4$, $Li_2S$—$SiS_2$—$Li_pMO_q$ (where p and q each are a positive number, M represents any of P, Si, Ge, B, Al, Ga, or In), $Li_{7-x}PS_{6-x}Cl_x$ (where $0 \leq x \leq 2$), $Li_{7-x}PS_{6-x}Br_x$ (where $0 \leq x \leq 2$), and $Li_{7-x}PS_{6-x}I_x$ (where $0 \leq x \leq 2$). The sulfide-based solid electrolyte may be prepared by melting and quenching starting materials (e.g., $Li_2S$ and/or $P_2S_5$), or mechanically milling the starting materials.

$Li_2S$—$P_2S_5$—LiX may be, for example, $Li_2S$—$P_2S_5$—LiCl or $Li_2S$—$P_2S_5$—LiCl—LiBr.

Subsequently, the resultant may be heat-treated. The sulfide-based solid electrolyte may be amorphous or crystalline, or may be a mixed form thereof. In some embodiments, the sulfide-based solid electrolyte may include at least sulfur (S), phosphorus (P), and lithium (Li), as component elements among the sulfide-based solid electrolyte materials. For example, the sulfide-based solid electrolyte may be a material including $Li_2S$—$P_2S_5$. Here, when the material including $Li_2S$—$P_2S_5$ is utilized as a sulfide-based solid electrolyte material, a mixing molar ratio of $Li_2S$ and $P_2S_5$ ($Li_2S:P_2S_5$) may be, for example, in a range of about 50:50 to about 90:10.

The sulfide-based solid electrolyte may be, for example, an argyrodite compound including at least one selected from $Li_{7-x}PS_{6-x}Cl_x$ (where $0 \leq x \leq 2$), $Li_{7-x}PS_{6-x}Br_x$ (where $0 \leq x \leq 2$), and $Li_{7-x}PS_{6-x}I_x$ (where $0 \leq x \leq 2$). For example, the sulfide-based solid electrolyte may be an argyrodite compound including at least one selected from $Li_6PS_5Cl$, $Li_6PS_5Br$, and $Li_6PS_5I$.

A density of the argyrodite solid electrolyte may be in a range of about 1.5 g/cc to about 2.0 g/cc. When the density of the argyrodite solid electrolyte is about 1.5 g/cc or higher, internal resistance of the all-solid secondary battery 1 may decrease, and penetration of the solid electrolyte layer 30 by Li may be effectively suppressed.

An elastic modulus of the solid electrolyte may be, for example, in a range of about 15 GPa to about 35 GPa.

Solid Electrolyte Layer: Binder

The solid electrolyte layer 30 may include, for example, a binder. Non-limiting examples of the binder in the solid electrolyte layer 30 include styrene-butadiene rubber (SBR), polytetrafluoroethylene, polyvinylidene fluoride, and/or polyethylene, but embodiments are not limited thereto, and any material available as a binder in the art may be utilized. The binder of the solid electrolyte layer 30 may be identical to or different from the binders in the positive active material layer 12 and the first negative active material layer 22.

A thickness of the solid electrolyte layer 30 may be, for example, in a range of about 30 µm to about 60 µm.

Negative Electrode

Negative Electrode: Negative Active Material

The first negative active material layer 22 may include, for example, a negative active material and a binder.

The negative active material in the first negative active material layer 22 may be, for example, in the form of particles. An average particle diameter of the negative active material in the form of particles may be, for example, about 4 µm or less, about 3 µm or less, about 2 µm or less, about 1 µm or less, or about 900 nm or less. An average particle diameter of the negative active material in the form of particles may be, for example, about 10 nm to about 4 µm or less, about 10 nm to about 3 µm or less, about 10 nm to about 2 µm or less, about 10 nm to about 1 µm or less, or about 10 nm to about 900 nm or less. When the average particle diameter of the negative active material is within these ranges, reversible absorption and/or desorption of lithium during charging/discharging may be further facilitated. The average particle diameter of the negative active material may be, for example, a median diameter (D50), and may be measured by utilizing a laser diffraction particle diameter distribution meter, scanning electron microscope (SEM), and/or a transmission electron microscope (TEM).

The negative active material in the first negative active material layer 22 may include, for example, at least one selected from a carbonaceous negative active material and a metal or metalloid negative active material.

The carbonaceous negative active material may for example be amorphous carbon. Non-limiting examples of the amorphous carbon include carbon black (CB), acetylene black (AB), furnace black (FB), ketjen black (KB), and/or graphene, but embodiments are not limited thereto, and any material available as amorphous carbon in the art may be utilized. The amorphous carbon is carbon having little crystallinity or a very low crystallinity which is different from crystalline carbon or graphene-based carbon.

Non-limiting examples of the metal or metalloid negative active material may include at least one selected from the group consisting of gold (Au), platinum (Pt), palladium (Pd), silicon (Si), silver (Ag), aluminum (Al), bismuth (Bi), tin (Sn), and/or zinc (Zn), but embodiments are not limited thereto, and any material available as a metal negative active material or a metalloid negative active material capable of forming an alloy or a compound with lithium in the art may be utilized. For example, nickel (Ni) does not form an alloy with lithium and thus is not a metal negative active material.

The first negative active material layer 22 may include one negative active material or may include a mixture of a plurality of different negative active materials selected from these negative active materials. For example, the first negative active material layer 22 may only include amorphous carbon or may include at least one selected from the group consisting of gold (Au), platinum (Pt), palladium (Pd), silicon (Si), silver (Ag), aluminum (Al), bismuth (Bi), tin (Sn), and zinc (Zn). In some embodiments, the first negative active material layer 22 may include a mixture including amorphous carbon and at least one element selected from the group consisting of gold (Au), platinum (Pt), palladium (Pd), silicon (Si), silver (Ag), aluminum (Al), bismuth (Bi), tin (Sn), and zinc (Zn). A mixing ratio of the mixture of amorphous carbon to the element may be, for example, a weight ratio in a range of about 10:1 to about 1:2, about 5:1 to about 1:1, or about 4:1 to about 2:1, but embodiments are not limited thereto, and the mixing ratio may be selected according to characteristics of the all-solid secondary battery 1. When the negative active material has the composition, cycle characteristics of the all-solid secondary battery 1 may further be improved.

The negative active material in the first negative active material layer 22 may include, for example, a mixture including first particles formed of amorphous carbon and second particles formed of a metal or a metalloid. Non-limiting examples of the metal or metalloid include gold (Au), platinum (Pt), palladium (Pd), silicon (Si), silver (Ag), aluminum (Al), bismuth (Bi), tin (Sn), and/or zinc (Zn). In some embodiments, the metalloid may be a semiconductor. An amount of the second particles may be in a range of about 8 weight % to about 60 weight %, about 10 weight % to about 50 weight %, about 15 weight % to about 40 weight %, or about 20 weight % to about 30 weight % based on the total weight of the mixture. When the amount of the second particles is within these ranges, for example, cycle characteristics of the all-solid secondary battery 1 may further be improved.

Negative Electrode: Binder

Non-limiting examples of the binder in the first negative active material layer 22 include styrene-butadiene rubber (SBR), polytetrafluoroethylene, polyvinylidene fluoride, polyethylene, a vinylidene fluoride/hexafluoropropylene copolymer, polyacrylonitrile, and/or polymethylmethacrylate, but embodiments are not limited thereto, and any material available as a binder in the art may be utilized. The binder may be formed of one of the examples of the binder alone or a plurality of different binders.

When the first negative active material layer 22 includes the binder, the first negative active material layer 22 may be stabilized on the negative current collector 21. Also, cracks of the first negative active material layer 22 may be suppressed or reduced in spite of volume change and/or relative location change of the first negative active material layer 22 during charging/discharging. For example, when the first negative active material layer 22 does not include a binder, the first negative active material layer 22 may be easily separated from the negative current collector 21. At a part where the negative current collector 21 is separated from the first negative active material layer 22, the negative current collector 21 may be exposed and may contact the solid electrolyte layer 30, and thus a risk of short-circuit may increase. The first negative active material layer 22 may be prepared by, for example, coating and drying a slurry, in which materials forming the first negative active material layer 22 are dispersed, on the negative current collector 21. When the binder is included in the first negative active material layer 22, the negative active material may be stably dispersed in the slurry. For example, when the slurry is coated on the negative current collector 21 by utilizing a screen printing method, clogging of the screen (e.g., clogging by an aggregate of the negative active material) may be suppressed or reduced.

Negative Electrode: Other Additives

The first negative active material layer 22 may further include additives that are suitably utilized in an all-solid secondary battery in the art, such as a filler, a coating agent, a dispersant, and an ionic conducting agent.

Negative Electrode: First Negative Active Material Layer

A thickness of the first negative active material layer 22 may be, for example, about 50% or less, about 40% or less, about 30% or less, about 20% or less, about 10% or less, or about 5% or less of a thickness of the positive active material layer 12. For example, a thickness of the first negative active material layer 22 may be in a range of about 1 μm to about 20 μm, about 2 μm to about 10 μm, or about 3 μm to about 7 μm. When the thickness of the first negative active material layer 22 is too thin, lithium dendrites formed between the first negative active material layer 22 and the negative current collector 21 may destroy the first negative active material layer 22, and thus cycle characteristics of the all-solid secondary battery 1 may not be improved (e.g., may be deteriorated). When the thickness of the first negative active material layer 22 is too thick, an energy density of the all-solid secondary battery 1 may be deteriorated and internal resistance of the all-solid secondary battery 1 by the first negative active material layer 22 may increase, and thus cycle characteristics of the all-solid secondary battery 1 may not be improved.

For example, when the thickness of the first negative active material layer 22 decreases, a charge capacity of the first negative active material layer 22 may also decrease. The charge capacity of the first negative active material layer 22 may be, for example, about 50% or lower, about 40% or lower, about 30% or lower, about 20% or lower, about 10% or lower, about 5% or lower, or about 2% or lower of a charge capacity of the positive active material layer 12. The charge capacity of the first negative active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the positive active material layer 12. When the charge capacity of the first negative active material layer 22 is too low, a thickness of the first negative active material layer 22 is too thin, lithium dendrites formed between the first negative active material layer 22 and the negative current collector 21 during repeated charging/discharging processes destroys the first negative active material layer 22, and the cycle characteristics of the all-solid secondary battery 1 may not be improved. When the charge capacity of the first negative active material layer 22 is too high, an energy density of the all-solid secondary battery 1 may be deteriorated and internal resistance of the all-solid secondary battery 1 by the first negative active material layer 22 may increase, and thus cycle characteristics of the all-solid secondary battery 1 may not be improved.

The charge capacity of the positive active material layer 12 may be obtained by multiplying a weight of the positive active material in the positive active material layer 12 by a charge capacity density (mAh/g) of the positive active material. When one or more suitable types (kinds) of materials are utilized as the positive active material, a value of a charge capacity density multiplied by a weight of each of the positive active materials is calculated, and the total (sum) of these values is a charge capacity of the positive active material layer 12. A charge capacity of the first negative active material layer 22 may be calculated in substantially the same manner. For example, a charge capacity of the first negative active material layer 22 is obtained by multiplying a weight of the negative active material in the first negative active material layer 22 by a charge capacity density (mAh/g) of the negative active material. When one or more suitable types (kinds) of materials are utilized as the negative active material, a value of a charge capacity density multiplied by a weight of each of the negative active materials is calculated, and the total of these values is a charge capacity of the first negative active material layer 22. Here, the charge capacity densities of the positive active material and the negative active material may be estimated by utilizing an all-solid half-cell, in which lithium metal is utilized as a counter electrode. The charge capacities of the positive active material layer 12 and the first negative active material layer 22 may be directly measured by the charge capacity measurement utilizing the all-solid half-cell. When the measured charge capacity is divided by a weight of each of the active materials, a charge capacity density may be obtained. In some embodiments, the charge capacities of the positive active material layer 12 and the first negative active material layer 22 may be initial charge capacities measured in the first charging cycle.

Negative Electrode: Second Negative Active Material Layer (Deposition Layer)

Referring to FIG. 2B, the all-solid secondary battery 1 may, for example, further include a second negative active material layer 23 between the negative current collector 21 and the first negative active material layer 22. The all-solid secondary battery 1 may further include a second negative active material layer 23 between the solid electrolyte layer 30 and the first negative active material layer 22 by (e.g., as a result of) charging. In some embodiments, the all-solid secondary battery 1 may further include, for example, a second negative active material layer 23 between the negative current collector 21 and the first negative active material layer 22 and between the solid electrolyte layer 30 and the first negative active material layer 22 by charging. The second negative active material layer 23 may be a metal layer including lithium and/or a lithium alloy. The metal layer may include lithium and/or a lithium alloy. In this regard, for example, because the second negative active material layer is a metal layer including lithium, the second negative active material layer 23 may serve as a lithium reservoir. Non-limiting examples of the lithium alloy include a Li—Al alloy, a Li—Sn alloy, a Li—In alloy, a Li—Ag alloy, a Li—Au alloy, a Li—Zn alloy, a Li—Ge alloy, and/or a Li—Si alloy, but embodiments are not limited thereto, and any material available as a lithium alloy in the art may be utilized. The second negative active material layer 23 may be formed of one of these alloys or lithium or may be formed of one or more suitable alloys.

A thickness of the second negative active material layer 23 may be, for example, in a range of about 1 μm to about 1000 μm, about 1 μm to about 500 μm, about 1 μm to about 200 μm, about 1 μm to about 150 μm, about 1 μm to about 100 μm, or about 1 μm to about 50 μm, but embodiments are not limited thereto. When the thickness of the second negative active material layer is too thin, the second negative active material layer may not serve as a lithium reservoir. When the thickness of the second negative active material layer 23 is too thick, a weight and a volume of the all-solid secondary battery 1 may increase, and cycle characteristics may be deteriorated. The second negative active material layer may be, for example, a metal foil having a thickness within these ranges.

In the all-solid secondary battery 1, the second negative active material layer 23 may be disposed between the negative current collector 21 and the first negative active material layer 22 before assembling the all-solid secondary battery 1, or may be deposited between the negative current collector 21 and the first negative active material layer 22 by charging after assembling the all-solid secondary battery 1. When the second negative active material layer 23 is disposed between the negative current collector 21 and the first negative active material layer 22 before assembling the all-solid secondary battery 1, the second negative active material layer 23 may be a metal layer including lithium and thus may serve as a lithium reservoir. For example, a lithium foil may be disposed between the negative current collector 21 and the first negative active material layer 22 before assembling the all-solid secondary battery 1. In this regard, the cycle characteristics of the all-solid secondary battery 1 including the second negative active material layer 23 may further be improved. When the second negative active material layer 23 is deposited by charging after assembling the all-solid secondary battery 1, an energy density of the all-solid secondary battery 1 may increase due to not including the second negative active material layer during the assembling of the all-solid secondary battery 1. For example, the all-solid secondary battery 1 may be charged over a charge capacity of the first negative active material layer 22. In this regard, the first negative active material layer 22 may be overcharged. In the beginning of the charging, lithium may be absorbed in the first negative active material layer 22. The negative active material in the first negative active material layer 22 may form an alloy or a compound with lithium ions migrated from the positive electrode layer 10. When the negative active material layer is charged over the charge capacity of the first negative active material layer 22, for example, lithium may be deposited on a back surface of the first negative active material layer 22, which is between the negative current collector 21 and the first negative active material layer 22, and a metal layer corresponding to the second negative active material layer may be formed by the deposited lithium. The second negative active material layer 23 may be a metal layer mainly formed of lithium (i.e., metal lithium). This result because, for example, the negative active material in the first negative active material layer 22 is formed of a material capable of forming an alloy or a compound with lithium. During discharging, lithium in the first negative active material layer 22 and the second negative active material layer 23 (which is a metal layer) may be ionized and migrated in a direction to the positive electrode layer 10. Thus, lithium may be utilized as a negative active material in the all-solid secondary battery 1. Also, because the first negative active material layer 22 covers the second negative active material layer, the first negative active material layer 22 may serve as a protection layer of the second negative active material layer (a metal layer), and may suppress lithium deposition and growth of lithium dendrites at the same time. Thus, the risks of short-circuiting and capacity deterioration of the all-solid secondary battery 1 may be suppressed, and the cycle characteristics of the all-solid secondary battery 1 may be improved. Also, when the second negative active material layer is formed by charging after the assembling of the all-solid secondary battery 1, the negative current collector 21, the first negative active material layer 22, and a region between the negative current collector 21 and the first negative active material layer 22 may be, for example, Li-free regions substantially not including lithium (Li) in the initial state or in a post-discharge state.

Negative Electrode Layer: Third Negative Active Material Layer

Figure 2D:
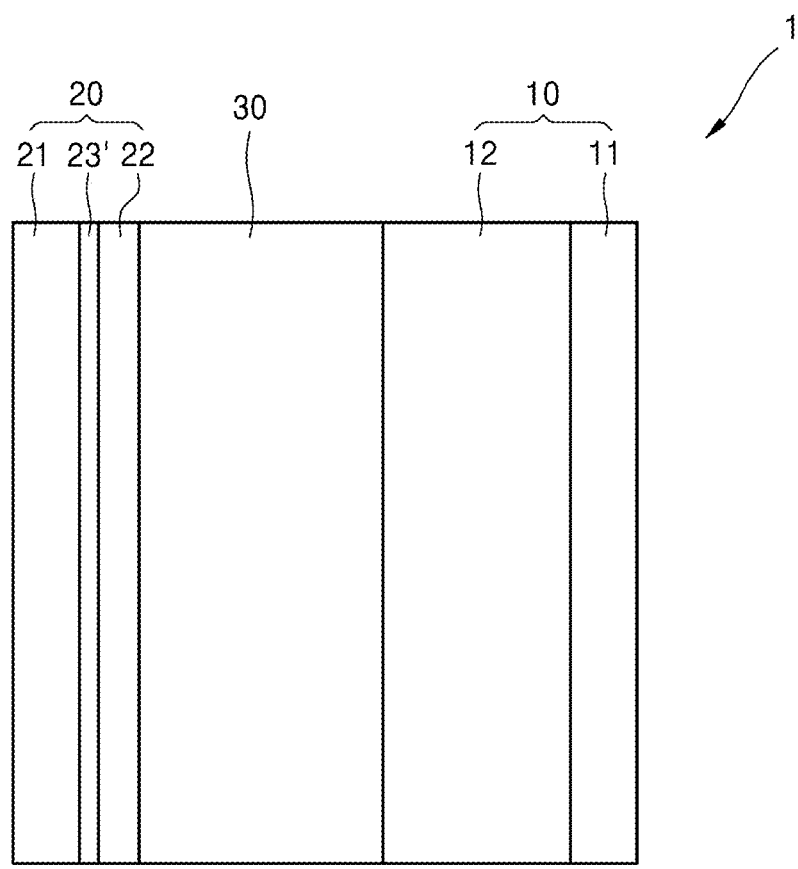
FIG. 2D shows a schematic structure of an all-solid secondary battery, according to another embodiment.

Referring to FIG. 2D, the all-solid secondary battery 1 may include a third negative active material layer 23'. The third negative active material layer 23' may be a metal layer including lithium and/or a lithium alloy. The metal layer may include lithium and/or a lithium alloy. In this regard, for example, because the third negative active material layer 23' is a metal layer including lithium, the third negative active material layer 23' may serve as a lithium reservoir. Non-limiting examples of the lithium alloy include a Li—Al alloy, a Li—Sn alloy, a Li—In alloy, a Li—Ag alloy, a Li—Au alloy, a Li—Zn alloy, a Li—Ge alloy, and/or a Li—Si alloy, but embodiments are not limited thereto, and any material available as a lithium alloy in the art may be utilized. The third negative active material layer 23' may be formed of one of these alloys or lithium or may be formed of one or more suitable alloys.

A thickness of the third negative active material layer 23' may be, for example, in a range of about 1 μm to about 100

μm, about 10 μm to about 100 μm, about 1 μm to about 50 μm, about 1 μm to about 40 μm, about 1 μm to about 30 μm, about 1 μm to about 20 μm, about 1 μm to about 15 μm, about 1 μm to about 10 μm, or about 1 μm to about 5 μm, but embodiments are not limited thereto. When the thickness of the third negative active material layer 23' is too thin, the third negative active material layer 23' may not serve as a lithium reservoir. When the thickness of the third negative active material layer 23' is too thick, a weight and a volume of the all-solid secondary battery 1 may increase, and cycle characteristics may be deteriorated. The third negative active material layer 23' may be, for example, a metal deposition layer or a metal foil having a thickness within these ranges.

As shown in FIG. 2C, a lithium halide layer 24 may further be disposed between the third negative active material layer 23' and the solid electrolyte layer 30. The lithium halide layer 24 may act as a passivation layer, and thus may prevent or reduce deterioration of the third negative active material layer 23'. The lithium halide layer 24 is a high-strength and high-hardness layer, and thus may be a protecting layer that protects the third negative active material layer 23'. The lithium halide layer 24 may include at least one selected from LiF, LiCl, LiBr, and LiI. In some embodiments, the lithium halide layer 24 may be a LiF layer. The lithium halide layer 24 may be disposed on the third negative active material layer 23' by deposition. A thickness of the lithium halide layer 24 may be, for example, in a range of about 10 μm to about 300 μm, about 10 μm to about 200 μm, about 10 μm to about 150 μm, about 10 μm to about 100 μm, about 10 μm to about 90 μm, about 10 μm to about 80 μm, about 10 μm to about 60 μm, or about 20 μm to about 50 μm, but embodiments are not limited thereto. When the thickness of the lithium halide layer 24 is too thin, the lithium halide layer 24 may not prevent or reduce deterioration of the third negative active material layer 23'. When the thickness of the lithium halide layer 24 is too thick, an energy density of the all-solid secondary battery 1 may decrease.

In some embodiments, a carbon layer may further be disposed on the lithium halide layer 24. When the carbon layer is further disposed on the lithium halide layer 24, interfacial resistance between the lithium halide layer 24 and the solid electrolyte layer 30 may decrease. A thickness of the carbon layer may be, for example, in a range of about 1 μm to about 10 μm, about 2 μm to about 10 μm, or about 3 μm to about 5 μm. When the thickness of the carbon layer is too thin, interfacial resistance between the lithium halide layer 24 and the solid electrolyte layer 30 may not effectively decrease. When the thickness of the carbon layer is too thick, an energy density of the all-solid secondary battery 1 may decrease. The carbon layer may include a binder and a carbonaceous material. The carbonaceous material may include amorphous carbon and/or crystalline carbon. The binder may include a binder (e.g., the same binders) utilized in the positive electrode. In some embodiments, the carbon layer may include both (e.g., simultaneously) amorphous carbon and crystalline carbon. A weight ratio of the amorphous carbon and crystalline carbon in the carbon layer may be, for example, in a range of about 4:6 to about 6:4.

Negative Electrode: Negative Current Collector

The negative current collector 21 may be formed of, for example, a material that does not react with lithium, e.g., a material that does not form both a lithium alloy or a lithium compound. Non-limiting examples of the material for forming the negative current collector 21 include copper (Cu), stainless steel, titanium (Ti), iron (Fe), cobalt (Co), and/or nickel (Ni), but embodiments are not limited thereto, and any material available as an electrode current collector in the art may be utilized. The negative current collector 21 may be formed of one of the examples of the metal or an alloy or a coating material of at least two metals. The negative current collector 21 may be, for example, in the form of a plate or a foil.

The all-solid secondary battery 1 may further include, for example, a thin film including an element that is capable of forming an alloy with lithium on the negative current collector 21. The thin film may be disposed between the negative current collector 21 and the first negative active material layer 22. The thin film may, for example, include an element capable of forming an alloy with lithium. Non-limiting examples of the element capable of forming an alloy with lithium include gold, silver, zinc, tin, indium, silicon, aluminum, and/or bismuth, but embodiments are not limited thereto, and any element capable of forming an alloy with lithium in the art may be utilized. The thin film may be formed of any of these metals or alloys of one or more suitable metals. When the thin film is disposed on the negative current collector 21, for example, the deposition form of a second negative active material layer deposited between the thin film and the first negative active material layer 22 may further be planarized, and thus cycle characteristics of the all-solid secondary battery 1 may further be improved.

A thickness of the thin film may be, for example, in a range of about 1 nm to about 800 nm, about 10 nm to about 700 nm, about 50 nm to about 600 nm, or about 100 nm to about 500 nm. When the thickness of the thin film is less than 1 nm, the functions of the thin film may not be realized. When the thickness of the thin film is too thick, the thin film itself may absorb lithium, and a deposition amount of lithium in a negative electrode may decrease, resulting in deterioration of an energy density of the all-solid secondary battery 1, and thus the cycle characteristics of the all-solid secondary battery 1 may be deteriorated. The thin film may be disposed on the negative current collector 21 by, for example, vacuum vapor deposition, sputtering, or plating, but embodiments are not limited thereto, and any method capable of forming a thin film in the art may be utilized.

According to an embodiment, an all-solid secondary battery may include a positive electrode having a thickness in a range of about 70 μm to about 150 μm, a solid electrolyte layer having a thickness in a range of about 30 μm to about 60 μm, and a negative electrode having a thickness in a range of about 10 μm to about 100 μm.

An all-solid secondary battery according to an embodiment may be applied in a medium-to-large battery or in an energy storage system (ESS). The all-solid secondary battery according to an embodiment may be, for example, utilized as a vehicle battery.

One or more embodiments will now be described in more detail with reference to examples. However, these examples are not intended to limit the scope of embodiments of the present disclosure.

Preparation of Positive Active Material

Preparation Example 1: Preparation of Positive Active Material {$LiNi_{0.966}Co_{0.028}Al_{0.005}O_2$ (NCA) Core+Co-Rich NCA Shell+$aLi_2O$—$LaO_2$ (LLaO) Coating Layer} (Average Particle Diameter: About 6 μm)

Cobalt sulfate ($CoSO_4$) as a cobalt precursor, and sodium hydroxide (NaOH) were added and mixed to a nickel-based active material, $LiNi_{0.967}Co_{0.019}Al_{0.014}O_2$ (NCA) (particle diameter: about 6 μm), and the resultant was heat-treated at a temperature of about 700° C., and thus a positive active material containing $LiNi_{0.966}Co_{0.028}Al_{0.006}O_2$ (NCA) (core) and Co-rich NCA (shell) on the core was obtained. Here, the Co-rich NCA included $LiNi_{0.563}Co_{0.430}Al_{0.007}O_2$. An overall composition of the positive active material (nickel-based active material) including the core and the shell was $LiNi_{0.917}Co_{0.069}Al_{0.014}O_2$ (NCA).

An amount of Co-rich NCA ($LiNi_{0.563}Co_{0.430}Al_{0.007}O_2$) of the shell was about 7 parts by weight based on 100 parts by weight of the total weight of the nickel-based active material having a structure including a core and a shell.

Separately, a solution mixture including 0.118 g of lithium methoxide, 1.129 g of lanthanum propoxide, 20 g of isopropyl alcohol, and 10 g of ethyl acetoacetate were stirred and mixed for about 30 minutes, and thus an alcohol solution of $aLi_2O$—$LaO_2$ (where a=1) (e.g., $aLi_2O$—$LaO_2$-coating solution) was prepared. Here, an amount of lithium methoxide and lanthanum propoxide, that is an amount of $aLi_2O$—$LaO_2$ (where a=1) coated on a surface of the nickel-based active material, was controlled to be about 0.56 parts by weight based on 100 parts by weight of the total weight of the nickel-based active material and $aLi_2O$—$LaO_2$ (where a=1). As used herein, the term "100 parts by weight of the total weight of the nickel-based active material and $aLi_2O$—$LaO_2$ (where a=1)" denotes 100 parts by weight of the total weight of the nickel-based active material including a core and a shell and a lithium ion conductor, $aLi_2O$—$LaO_2$ (where a=1).

Next, the $aLi_2O$—$LaO_2$-coating solution was mixed with the positive active material fine powder, and this solution mixture was heated to about 40° C. while stirring to evaporate the solvent and dry the positive active material. At this time, the mixture solution was irradiated with ultrasonic waves.

In this regard, a particle surface of the nickel-based active material fine powder may carry a precursor of $aLi_2O$—$LaO_2$.

Also, the precursor of $aLi_2O$—$LaO_2$ (where a=1) supported on the particle surface of the nickel-based active material was heat-treated at a temperature of about 300° C. for about 1 hour under oxygen atmosphere. During this heat-treatment, the precursor of $aLi_2O$—$LaO_2$ (where a=1) present on the nickel-based active material was changed to $aLi_2O$—$LaO_2$ (where a=1). An amount of $Li_2O$—$LaO_2$ (LLaO) was about 0.56 parts by weight based on 100 parts by weight of the total weight of the nickel-based active material and the lithium ion conductor.

According to the preparation process, a nickel-based active material having an $aLi_2O$—$LaO_2$ coating layer, {$LiNi_{0.966}Co_{0.028}Al_{0.006}O_2$ (NCA) core+Co-rich NCA shell+$aLi_2O$—$LaO_2$ (LLaO) coating layer}, which was a positive active material, was obtained. A composition of the Co-rich NCA was $LiNi_{0.563}Co_{0.430}Al_{0.007}O_2$, and a composition of the positive active material containing a core and a shell was $LiNi_{0.917}Co_{0.069}Al_{0.014}O_2$ (NCA).

Preparation Example 2

A positive active material was prepared in substantially the same manner as in Preparation Example 1, except that an amount of lithium methoxide and lanthanum propoxide was controlled so that an amount of $aLi_2O$—$LaO_2$ (where a=1) coated on a surface of the nickel-based positive active material was about 0.94 parts by weight based on 100 parts by weight of the total weight of the nickel-based active material and the lithium ion conductor.

0.196 g of lithium methoxide, 1.882 g of lanthanum propoxide, and 20 g of isopropyl alcohol were mixed to prepare a mixture, and the mixture was utilized as an $aLi_2O$—$LaO_2$-coating solution.

Preparation Example 3

A positive active material was prepared in substantially the same manner as in Preparation Example 1, except that an amount of lithium methoxide and lanthanum propoxide was controlled so that an amount of $aLi_2O$—$LaO_2$ (where a=1) coated on a surface of the nickel-based positive active material, was about 1.32 parts by weight based on 100 parts by weight of the total weight of the nickel-based active material and the lithium ion conductor. Here, 0.275 g of lithium methoxide, 2.635 g of lanthanum propoxide, and 20 g of isopropyl alcohol were mixed to prepare a mixture, and the mixture was utilized as an $aLi_2O$—$LaO_2$-coating solution.

Preparation Example 4

A positive active material was prepared in substantially the same manner as in Preparation Example 1, except that an amount of lithium methoxide and lanthanum propoxide was controlled so that an amount of $aLi_2O$—$LaO_2$ (where a=1) coated on a surface of the nickel-based positive active material was about 0.94 parts by weight based on 100 parts by weight of the total weight of the nickel-based active material and the lithium ion conductor. Here, 0.392 g of lithium methoxide, 3.764 g of lanthanum propoxide, and 20 g of isopropyl alcohol were mixed to prepare a mixture, and the mixture was utilized as an $aLi_2O$—$LaO_2$-coating solution.

Preparation Examples 5 and 6

Positive active materials were each prepared in substantially the same manner as in Preparation Example 1, except that an amount of lithium methoxide and lanthanum propoxide was controlled so that an amount of $aLi_2O$—$LaO_2$ (where a=1) coated on a surface of the nickel-based positive active material was about 0.1 parts and about 3 parts by weight based on 100 parts by weight of the total weight of the nickel-based active material and the lithium ion conductor, respectively.

Comparative Preparation Example 1

A positive active material was prepared in substantially the same manner as in Preparation Example 1, except that a LLaO coating layer was not formed on a surface of the nickel-based active material.

Comparative Preparation Example 2

A positive active material was prepared in substantially the same manner as in Preparation Example 1, except that a shell having Co-rich NCA was not formed on $LiNi_{0.88}Co_{0.105}Al_{0.015}O_2$ (NCA).

Reference Preparation Example 1

A positive active material was prepared in substantially the same manner as in Preparation Example 1, except that an amount of lithium methoxide and lanthanum propoxide was controlled so that an amount of $aLi_2O$—$LaO_2$ (where a=1) coated on a surface of the nickel-based positive active material was about 0.05 parts by weight based on 100 parts by weight of the total weight of the nickel-based active material and the lithium ion conductor.

Reference Preparation Example 2

A positive active material was prepared in substantially the same manner as in Preparation Example 1, except that an amount of lithium methoxide and lanthanum propoxide was controlled so that an amount of $aLi_2O$—$LaO_2$ (where a=1) coated on a surface of the nickel-based positive active material was about 12 parts by weight based on 100 parts by weight of the total weight of the nickel-based active material and the lithium ion conductor.

Pouch-Type (Format) all-Solid Secondary Battery

Example 1

Preparation of Positive Electrode

The positive active material prepared in Preparation Example 1 was utilized as a positive active material.

An argyrodite crystal material, i.e., a $Li_6PS_5Cl$ solid electrolyte (D50=0.6 μm, crystalline), was prepared as a solid electrolyte. A polytetrafluoroethylene (PTFE) binder (from Daikin) was prepared as a binder. Carbon nanofibers (CNFs) were prepared as a conducting agent. The positive active material, the solid electrolyte, the conducting agent, and the binder were mixed at a weight ratio of about 89:8.8:1.22:0.98 with a xylene solvent to prepare a positive active material composition, and the composition was molded into the sheet form and then vacuum-dried at about 40° C. for about 8 hours, and thus a positive active material layer was prepared.

The positive active material layer was stacked on a carbon-coated Al current collector and pressed by a roll-press, and thus a positive electrode was prepared.

Preparation of Negative Electrode

A Ni-foil having a thickness of about 10 μm was prepared as a negative current collector.

6 g of carbon black (CB) having a primary particle diameter of about 30 nm was added to a container, and 8 g of an NMP solution including 5 weight % of a PVDF binder (#9300 available from Kureha) was added thereto to prepare a solution mixture. Then, the solution mixture was stirred while dropwise adding NMP to prepare a slurry. The prepared slurry was coated on a Ni current collector utilizing a bar coater and dried in the air at about 80° C. for about 10 minutes, and thus a carbon layer containing carbon black and silver was formed. A thickness of the carbon layer was about 7 μm.

A negative electrode was prepared as described above. A thickness of the first negative active material layer having a multi-layer structure of carbon layer and Ag layer in the negative electrode was about 4 μm.

Preparation of Solid Electrolyte Layer 99 parts by weight of a Li-argyrodite material ($Li_6PS_5Cl$, $D_{50}$=3 μm, crystalline), 1 part by weight of poly(styrene-co-butyl acrylate) (molar ratio of 8:2), which is an acryl-based binder, and 495 parts by weight of xylene were mixed in a Thinky mixer (1300 rpm, 5 min) to prepare a positive electrode active material slurry. A layer was formed on non-woven fabric (thickness: 15 μm) on release-type polyethylene terephthalate (PET) (thickness: 75 μm) utilizing the slurry and a bar coater, a liquid component thereof was evaporated in a convection oven (80° C., 10 min), and the resultant was dried in a vacuum oven (40° C., 10 hr) to prepare a solid electrolyte layer (thickness before pressing: 90 μm, thickness after WIP pressing: 45 μm).

Preparation of all-Solid Secondary Battery

The negative electrode obtained as described above, the solid electrolyte layer, and the positive electrode were sequentially stacked to prepare a stack. The stack was added to a pouch and sealed to prepare a unit cell of a pouch-type (format) negative electrode/solid electrolyte layer/positive electrode. A thickness of the solid electrolyte layer was about 45 μm.

Examples 2 to 6

Additional pouch-cell all-solid secondary batteries were each prepared in substantially the same manner as in Example 1, except that the positive active materials prepared in Preparation Examples 2 to 4 were each respectively utilized as a positive active material.

Torque-Cell All-Solid Secondary Battery

Example 7

Preparation of Positive Electrode

The positive active material prepared in Preparation Example 1 was utilized as a positive active material An argyrodite crystal material, i.e., a $Li_6PS_5Cl$ solid electrolyte (D50=0.6 μm, crystalline), was prepared as a solid electrolyte. A polytetrafluoroethylene (PTFE) binder (from Daikin) was prepared as a binder. Carbon nanofibers (CNFs) were prepared as a conducting agent. The positive active material, the solid electrolyte, and the conducting agent were mixed at a weight ratio of about 65:35:5 to prepare a positive active material composition, and the composition was molded in the form of pellets and then vacuum-dried at about 40° C. for about 8 hours, and thus a positive active material layer in the form of a pellet was prepared.

The positive active material layer was stacked on a carbon-coated Al current collector and pressed with a roll-press, and thus a positive electrode in the form of a pellet was prepared.

Preparation of Negative Electrode

A lithium metal having a thickness of about 25 μm was utilized as a negative electrode.

Preparation of Solid Electrolyte Layer 100 parts by weight of Li-argyrodite ($Li_6PS_5Cl$, $D_{50}$=3 μm, crystalline) having a thickness of about 100 μm (13Φ) was pressed and pelletized at a pressure of about 3 Nm.

Preparation of all-Solid Secondary Battery

The negative electrode obtained as described above, the solid electrolyte layer, and the positive electrode were sequentially stacked to prepare a stack. The stack was plate-pressed at a pressure of about 500 MPa for about 1 min to prepare a unit cell of torque-cell negative electrode/solid electrolyte layer/positive electrode. By this pressing, the solid electrolyte layer was sintered to improve battery characteristics. A thickness of the sintered solid electrolyte layer was about 45 μm.

Examples 8 to 12

Torque-cell all-solid secondary batteries were each prepared in substantially the same manner as in Example 7, except that the positive active materials prepared in Preparation Examples 2 to 4 were each respectively utilized as a positive active material.

Comparative Examples 1 and 2

Pouch-type (format) all-solid secondary batteries were prepared in substantially the same manner as in Example 1, except that the positive active materials prepared in Comparative Examples 1 and 2 were each respectively utilized as a positive active material.

Comparative Examples 3 and 4

Torque-cell all-solid secondary batteries were each prepared in substantially the same manner as in Example 7, except that the positive active materials prepared in Comparative Preparation Examples 1 and 2 were each respectively utilized as a positive active material.

Reference Examples 1 and 2

Pouch-type (format) all-solid secondary batteries were prepared in substantially the same manner as in Example 1, except that the positive active materials prepared in Reference Preparation Examples 1 and 2 were each respectively utilized as a positive active material.

Evaluation Example 1: Impedance

The impedance characteristics of the torque-cell all-solid secondary batteries of Examples 7 to 9 and Comparative Example 3 were measured. The impedances of the all-solid secondary batteries were evaluated by measuring the cell resistance after applying a voltage bias of 10 mV within a frequency range of about $10^6$ MHz to about 0.1 MHz at a temperature of about 25° C. according to a 2-probe method utilizing an impedance analyzer (Solartron 1260A Impedance/Gain-Phase Analyzer). Some of the evaluation results are shown in Table 1.

TABLE 1

| Sample | Impedance Ω |
|---|---|
| Example 7 | 80-130 |
| Example 8 | 80-130 |
| Example 9 | 80-130 |
| Comparative Example 3 | 250-300 |

Figure 3:
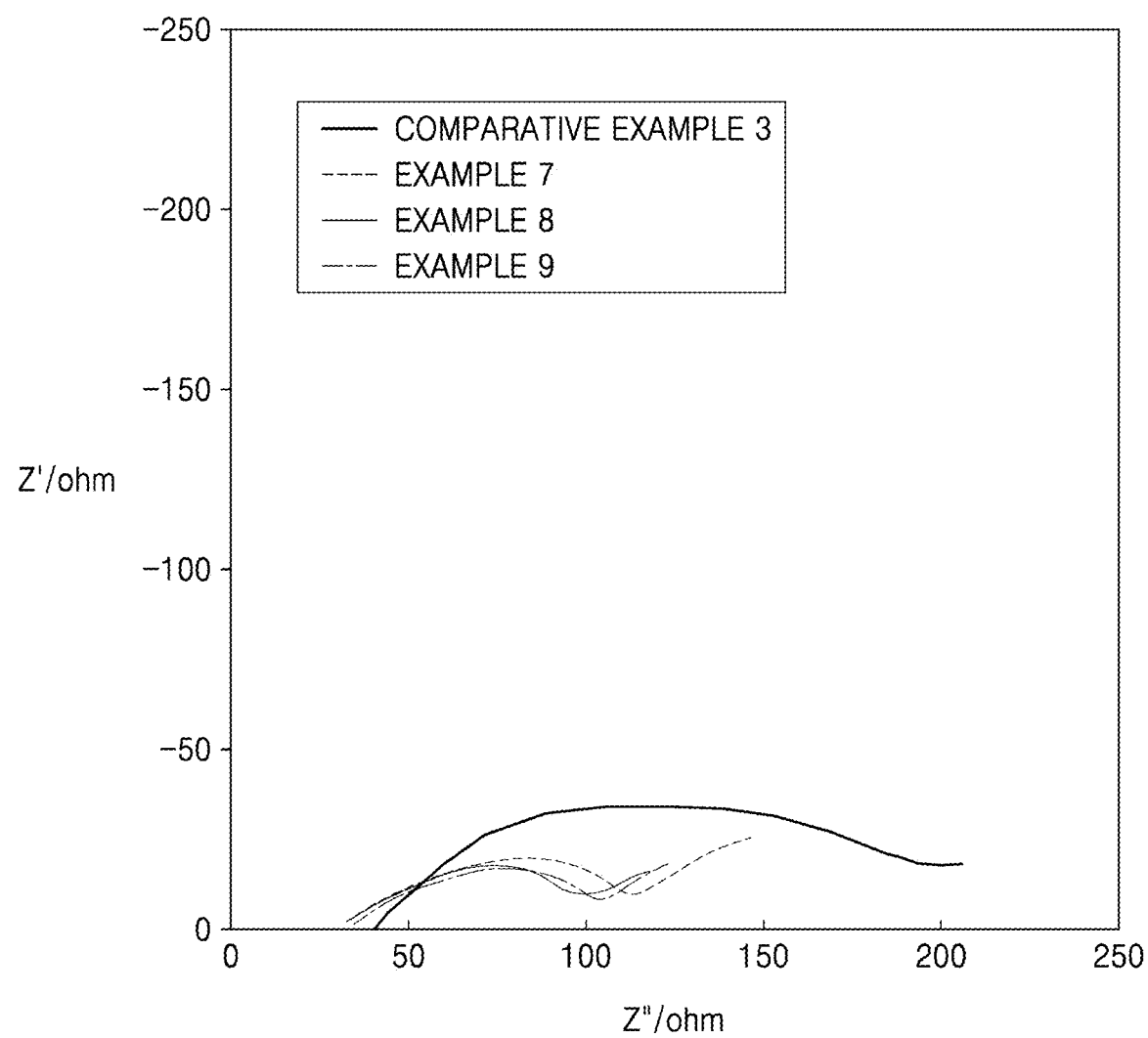
FIG. 3 shows impedance characteristics of all-solid secondary batteries prepared in Examples 7 to 9 and Comparative Example 3.

When the time elapsed after the preparation of each of the all-solid secondary batteries was 24 hours, impedance measurements were taken, and the Nyquist plot results are shown in FIG. 3. In FIG. 3, bulk resistances of the electrodes are determined by (e.g., correlated with) the positions and magnitudes of semicircles (e.g., the semicircle shapes in the plots), and the reported resistance values are the differences between the left x-axis intercept and the right x-axis intercept of the semicircles.

Referring to FIG. 3 and Table 1, it may be observed that the bulk resistances of the all-solid secondary batteries of Examples 7 to 9 significantly decreased, compared to that of the all-solid secondary battery of Comparative Example 3.

Evaluation Example 2: Energy Dispersive X-Ray Spectroscopy (EDX) Analysis

Figure 4:
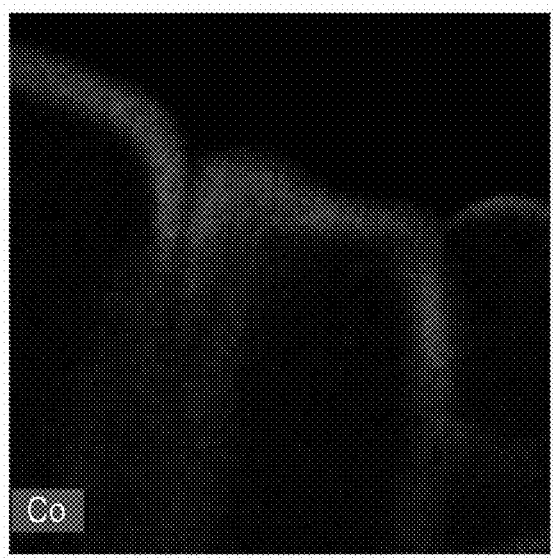
FIGS. 4 and 5 show the results of energy-dispersive X-ray (EDAX) analysis for cobalt (Co) and lanthanum (La), respectively, of a positive active material prepared in Preparation Example 1.
Figure 5:
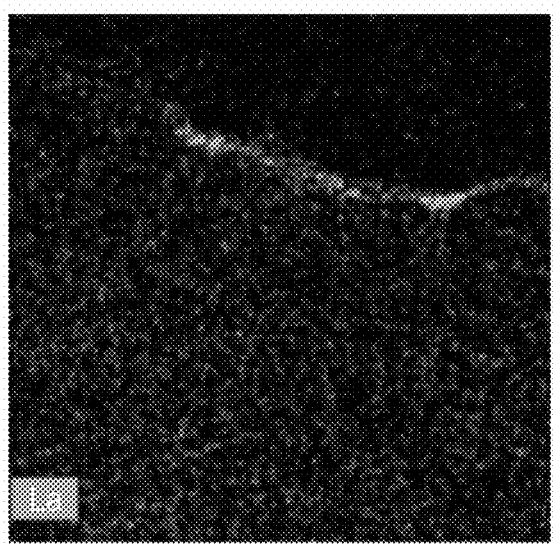

An energy dispersive X-ray spectroscopy (EDX) test was performed to analyze a composition (e.g., presence) of various transition metals in the composite positive active material prepared in Preparation Example 1, and some of the results of the test are shown in FIGS. 4 and 5. The EDX measuring device utilized in performing the tests was a FEI Sirion SEM_EDX.

As shown in FIG. 4, the positive active material of Preparation Example 1 includes a cobalt-rich composition in the shell region.

Also, a lanthanum-rich composition is localized on a surface of the positive active material of Preparation Example 1.

Evaluation Example 3: Efficiency and Lifetime Characteristics

Charge and discharge characteristics of the pouch-cell all-solid secondary batteries prepared in Examples 1 to 3, Comparative Examples 1 and 2, and Reference Examples 1 and 2 were evaluated utilizing a charger/discharger (model: TOYO-3100, available from TOYO).

In the first charging/discharging cycle, the batteries were each charged with a constant current of about 0.1 C until a voltage of the battery was about 4.25 V, and then charged with a constant voltage until a current was about 0.05 C. The completely charged cell was then rested for about 10 minutes, and discharged with a constant current of about 0.1 C until a voltage of the battery was about 2.5 V. In the second charging/discharging cycle, the battery was charged with a constant current of about 0.2 C until a voltage of the battery was about 4.25 V, and then charged with a constant voltage until a current was about 0.05 C. The completely charged cell was then rested for about 10 minutes, and discharged with a constant current of about 0.2 C until a voltage of the battery was about 2.5 V.

The lifetime evaluation of the batteries was performed by running 100 cycles, where in each of the 100 cycles, the battery was charged with a constant current of about 1 C until a voltage of the battery was about 4.25 V and then charging the battery with a constant voltage until a current was about 0.05 C. The completely charged cell was then rested for about 10 minutes, and discharged with a constant current of about 1 C until a voltage of the battery was about 2.5 V.

Figure 6:
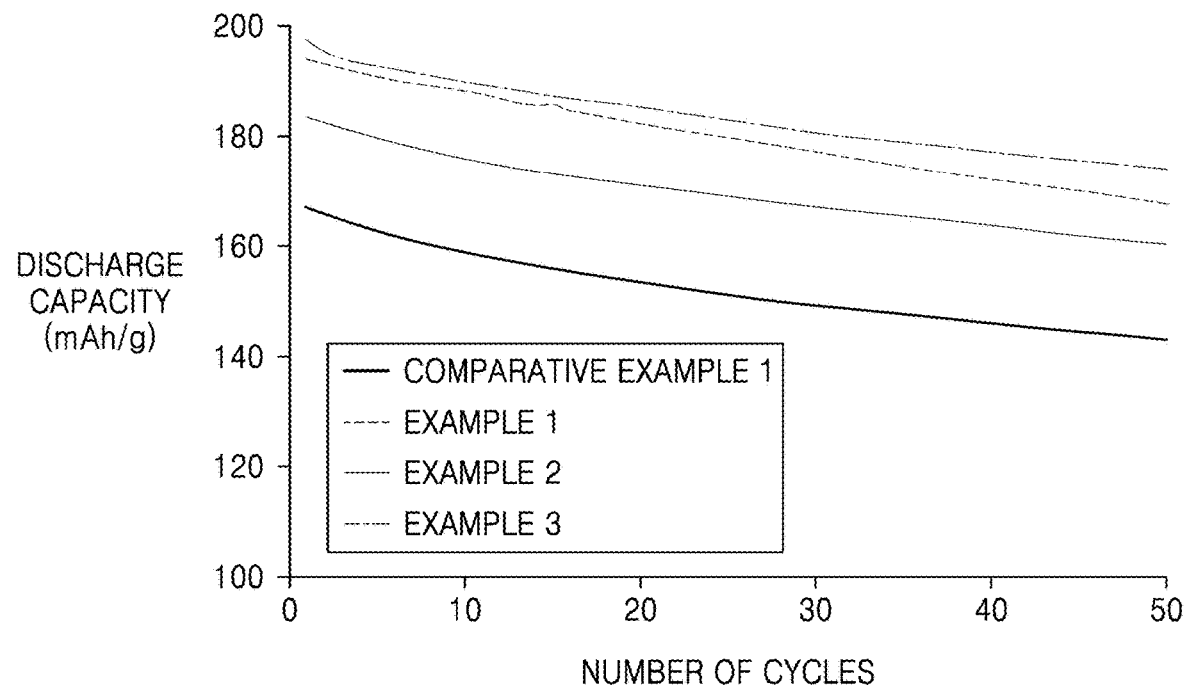
FIG. 6 is a graph that shows lifetime characteristics of all-solid secondary batteries prepared in Examples 1-3 and Comparative Example 1.

Changes in discharge capacity with respect to the number of cycles were shown in FIG. 6.

Referring to FIG. 6, the all-solid secondary batteries of Examples 1 to 3 had improved lifetime characteristics compared to the all-solid secondary battery of Comparative Example 1.

Also, the lifetime characteristics of the all-solid secondary batteries of Examples 5 and 6 and Reference Examples 1 and 2 were evaluated using the same evaluation method in Example 1.

As a result, the all-solid secondary batteries of Examples 5 and 6 had the same lifetime characteristics as the all-solid secondary battery of Example 1. Also, the all-solid secondary batteries of Examples 5 and 6 had improved lifetime characteristics compared to the all-solid secondary batteries of Reference Examples 1 and 2.

Evaluation Example 3: High-Rate Characteristics

Each of the all-solid secondary batteries was charged/discharged at 0.33 C, 1.0 C, and 2.0 C in a range of about 2.5 V to about 4.25 V, and the discharge capacity changes according to the C-rates of the batteries are shown in FIG.

7. Also, a ratio of a discharge capacity when the c-rate was 1.0 C to a discharge capacity when the c-rate was 0.33 C is shown in Table 2.

TABLE 2

| Sample | Discharge capacity (mAh/g) | | | | 1 C Rates/ 0.33 C (%) |
|---|---|---|---|---|---|
| | 0.05 C | 0.33 C | 0.5 C | 1.0 C | |
| Example 1 | 210 | 188 | 181 | 170 | 96 |
| Example 2 | 210 | 185 | 175 | 170 | 96 |
| Example 3 | 195 | 175 | 170 | 160 | 95 |
| Comparative Example 1 | 250 | 190 | 165 | 150 | 87 |

Figure 7:
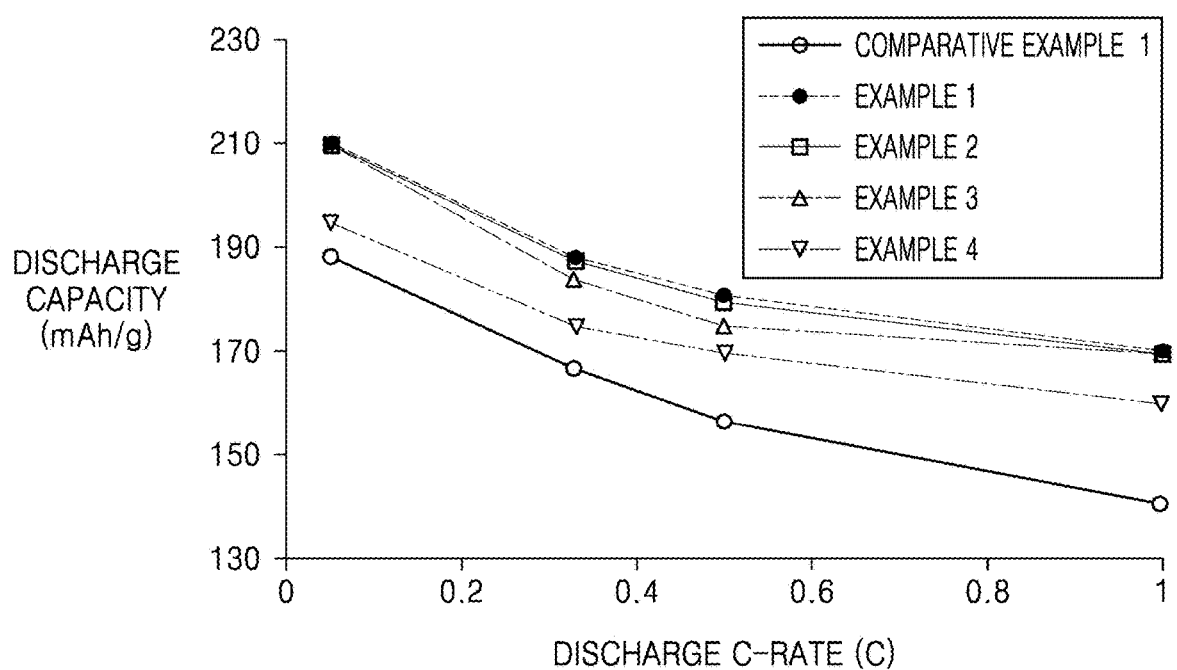
FIG. 7 is a graph that shows high-rate characteristics of all-solid secondary batteries prepared in Examples 1-4 and Comparative Example 1.

Referring to Table 2 and FIG. 7, the all-solid secondary batteries prepared in Examples 1 to 3 had lower resistance of an electrode plate compared to that of the all-solid secondary battery prepared in Comparative Example 1, and thus charge/discharge capacity and lifetime and high-rate characteristics of the all-solid secondary batteries of Examples 1 to 3 were improved compared to the all-solid secondary battery prepared in Comparative Example 1.

The all-solid secondary battery of Example 4 had charge/discharge capacity and lifetime and high-rate characteristics similar to those of the all-solid secondary battery of Example 1.

According to one or more embodiments, an all-solid secondary battery has improved resistance of an electrode and improved current density characteristics, and thus high-rate characteristics and lifetime characteristics as well as capacity characteristics of the all-solid secondary battery may be improved.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as being available for other similar features or aspects in other embodiments. While one or more embodiments have been described with reference to the drawings, it will be understood by those of ordinary skill in the art that one or more suitable changes in form and details may be made therein without departing from the spirit and scope of the disclosure as defined by claims and equivalents thereof.

What is claimed is:

1. A positive electrode for an all-solid secondary battery, the positive electrode comprising a positive active material and a sulfide-based solid electrolyte,
wherein:
the positive active material has a structure containing a core and a shell,
the shell comprises a first nickel-based active material containing cobalt (Co), a thickness of the shell, comprising the first nickel-based active material containing cobalt, being in a range of about 5 nm to about 100 nm,
a surface of the positive active material comprises a coating layer comprising at least one lithium ion conductor selected from a lanthanum oxide and a lithium lanthanum oxide, a thickness of the coating layer being in a range of about 0.1 nm to about 50 nm,
an amount of the lithium ion conductor is in a range of about 0.1 parts to about 10 parts by weight based on 100 parts by weight of the total weight of the positive active material and the lithium ion conductor,
wherein an amount of the shell is in a range of about 0.3 parts to about 10 parts by weight based on 100 parts by weight of the total weight of the positive active material having the structure containing the core and the shell, and
wherein the positive electrode has a density of a mixture comprising the positive active material and the sulfide-based solid electrolyte in a range of about 3.4 g/cm$^3$ to about 3.7 g/cm$^3$.

2. The positive electrode of claim 1, wherein an amount of cobalt in the first nickel-based active material containing cobalt (Co) is about 30 mol % or higher.

3. The positive electrode of claim 1, wherein the lithium lanthanum oxide is represented by Formula 1:

$$aLi_2O\text{-}LaO_2, \text{ and} \qquad \text{Formula 1}$$

wherein, in Formula 1, 0.1≤a≤2.0.

4. The positive electrode of claim 1, wherein the first nickel-based active material containing cobalt (Co) is represented by Formula 2:

$$Li_aNi_{1-x-y-z}Co_xM1_yM2_zO_2, \text{ and} \qquad \text{Formula 2}$$

wherein, in Formula 2, 0.9a1.3,
M1 is manganese (Mn) or aluminum (Al),
M2 is boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof,
0.3≤x≤0.6, 0.002≤y≤0.05, 0≤z<1, and x+y+z<1.

5. The positive electrode of claim 1, wherein an amount of the sulfide-based solid electrolyte is in a range of about 5 parts to about 15 parts by weight based on 100 parts by weight of the total weight of the positive electrode.

6. The positive electrode of claim 1, wherein the core of the positive active material comprises a second nickel-based active material represented by Formula 3:

$$Li_a(Ni_{1-x-y-z}Co_xM1_yM2_z)O_2, \text{ and} \qquad \text{Formula 3}$$

wherein, in Formula 3, M1 is manganese (Mn), aluminum (Al), or a combination thereof,
M2 is boron (B), magnesium (Mg), calcium (Ca), strontium (Sr), barium (Ba), titanium (Ti), vanadium (V), chromium (Cr), iron (Fe), copper (Cu), zirconium (Zr), aluminum (Al), or a combination thereof,
0.95≤a≤1.3, x≤((1-x-y-z), y≤(1-x-y-z), 0<x<1, 0≤y<1, and 0≤z<1.

7. The positive electrode of claim 6, wherein an amount of nickel in the second nickel-based active material represented by Formula 3 is in a range of about 80 mol % to about 98 mol %.

8. An all-solid secondary battery comprising:
the positive electrode of claim 1;
a negative electrode; and
a solid electrolyte layer between the positive electrode and the negative electrode,
wherein the solid electrolyte layer comprises the sulfide-based solid electrolyte.

9. The all-solid secondary battery of claim 8, wherein the sulfide-based solid electrolyte is at least one selected from $Li_2S$—$P_2S_5$, $Li_2S$—$P_2S_5$—LiCl, $Li_2S$—$P_2S_5$—LiBr, $Li_2S$—$P_2S_5$—LiCl—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive number, and Z is one of Ge, Zn, and Ga), $Li_2S$—$GeS_2$, $Li_2S$—$SiS_2$—$Li_3PO_4$, $Li_2S$—$SiS_2$-$Li_pMO_q$ (where p and q are each a positive number, and M is one of P, Si, Ge, B, Al, Ga, and In), $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2).

10. The all-solid secondary battery of claim 8, wherein the negative electrode comprises a negative current collector and a first negative active material layer on the negative current collector,
the first negative active material layer comprises a negative active material and a binder, the negative active material is in the form of particles, and
an average particle diameter of the negative active material is about 4 μm or less.

11. The all-solid secondary battery of claim 10, wherein the negative active material comprises at least one selected from a carbonaceous negative active material, a metal negative active material, and a metalloid negative active material.

12. The all-solid secondary battery of claim 11, wherein the carbonaceous negative active material comprises at least one selected from amorphous carbon and crystalline carbon.

13. The all-solid secondary battery of claim 11, wherein the metal negative active material and/or metalloid negative active material comprises at least one selected from the group consisting of gold (Au), platinum (Pt), palladium (Pd), silicon (Si), silver (Ag), aluminum (Al), bismuth (Bi), tin (Sn), and zinc (Zn).

* * * * *

UNITED STATES PATENT AND TRADEMARK OFFICE
CERTIFICATE OF CORRECTION

| | | |
|---|---|---|
| PATENT NO. | : 11,984,583 B2 | Page 1 of 1 |
| APPLICATION NO. | : 17/190770 | |
| DATED | : May 14, 2024 | |
| INVENTOR(S) | : Taeri Kwon | |

It is certified that error appears in the above-identified patent and that said Letters Patent is hereby corrected as shown below:

In the Claims

In Column 26, Line 44, in Claim 4, delete "0.9a1.3," and insert -- $0.9 \leq a \leq 1.3$, --.

In Column 26, Line 66, in Claim 6, delete "x≤((1-x-y-z)," and insert -- $x \leq (1-x-y-z)$, --.

Signed and Sealed this
Seventeenth Day of September, 2024

Katherine Kelly Vidal
*Director of the United States Patent and Trademark Office*